(12) United States Patent
Lu et al.

(10) Patent No.: US 10,924,195 B2
(45) Date of Patent: Feb. 16, 2021

(54) BOUNCED RAY TUBES WITH PREPROCESSING OF VISIBILITY

(71) Applicants: Polaris Wireless, Inc., Mountain View, CA (US); Alma Mater Studiorum—Università di Bologna, Bologna (IT)

(72) Inventors: Jonathan Shiao-En Lu, San Jose, CA (US); Vittorio Degli-Esposti, Sasso Marconi (IT); Enrico Maria Vitucci, Rimini (IT)

(73) Assignees: Polaris Wireless, Inc., Mountain View, CA (US); Alma Mater Studiorum—Università di Bologna, Bologna (IT)

( * ) Notice: Subject to any disclaimer, the term of this patent is extended or adjusted under 35 U.S.C. 154(b) by 712 days.

(21) Appl. No.: 15/633,825

(22) Filed: Jun. 27, 2017

(65) Prior Publication Data

US 2018/0375599 A1 Dec. 27, 2018

(51) Int. Cl.
*H04B 17/391* (2015.01)
(52) U.S. Cl.
CPC .................. *H04B 17/391* (2015.01)
(58) Field of Classification Search
CPC ..... H04W 16/18; H04W 16/22; H04W 16/20; H04B 17/3913; H04B 17/391; G06T 17/005
See application file for complete search history.

(56) References Cited

U.S. PATENT DOCUMENTS

| 5,450,615 | A | 9/1995 | Fortune et al. |
| 6,525,726 | B1 | 2/2003 | Xie et al. |
| 7,962,102 | B2 | 6/2011 | Corral et al. |
| 8,704,826 | B1 | 4/2014 | Hakura et al. |
| 8,970,584 | B1 | 3/2015 | Aila et al. |

(Continued)

FOREIGN PATENT DOCUMENTS

WO WO 2007/0350052 * 3/2007 ............. H04B 17/00

OTHER PUBLICATIONS

"Notice of Allowance and Fee(s) Due," issued in U.S. Appl. No. 15/633,828, dated Apr. 25, 2018.

(Continued)

*Primary Examiner* — Kandasamy Thangavelu
(74) *Attorney, Agent, or Firm* — McGeary Cukor LLC; Kenneth Ottesen; Jason Paul DeMont

(57) ABSTRACT

A system and method for ray launching in electromagnetic wave propagation modeling. A data-processing system receives a dataset that is representative of a plurality of structures within an environment. The plurality of structures is defined in the dataset as having a plurality of surfaces. The system then partitions each surface in the plurality of surfaces into a plurality of tiles. The system pre-computes whether i) the reference point of each corresponding tile in each plurality of tiles of each surface is visible or not from ii) the reference point of each possible spawning tile in each other plurality of tiles. The system then projects a first set of ray tubes based on the pre-computed visibility. The system evaluates the incidence of bounced ray tubes at a predetermined receive point within the environment and then presents a propagation result that is based on the evaluated incidence of the bounced ray tubes.

18 Claims, 27 Drawing Sheets

(56) References Cited

U.S. PATENT DOCUMENTS

| | | | | |
|---|---|---|---|---|
| 9,977,644 | B2* | 5/2018 | Schissler | G06F 3/165 |
| 2004/0259554 | A1* | 12/2004 | Rappaport | H04W 16/18 |
| | | | | 455/446 |
| 2009/0144037 | A1 | 6/2009 | Sibecas et al. | |
| 2010/0076730 | A1* | 3/2010 | Yonezawa | H04W 16/18 |
| | | | | 703/1 |
| 2010/0267343 | A1* | 10/2010 | Nyu | H04W 16/20 |
| | | | | 455/67.7 |
| 2011/0102420 | A1 | 5/2011 | Yoon et al. | |
| 2011/0134122 | A1* | 6/2011 | Park | G06T 17/005 |
| | | | | 345/426 |
| 2011/0153294 | A1* | 6/2011 | Yoon | H04W 16/22 |
| | | | | 703/6 |
| 2011/0281526 | A1* | 11/2011 | Matsuda | H04B 17/3913 |
| | | | | 455/67.11 |
| 2013/0115961 | A1* | 5/2013 | Shibayama | H04W 16/18 |
| | | | | 455/446 |
| 2016/0146945 | A1* | 5/2016 | Kamijo | G01S 19/428 |
| | | | | 342/357.61 |

OTHER PUBLICATIONS

Office action issued in U.S. Appl. No. 15/633,827, dated Aug. 8, 2019.

Hoppe et al., Advanced ray-optical wave propagation modelling for urban and indoor scenarios including wideband properties, 2003, Euro. Trans. Telecomms. 2003; 14:61-69 (Year: 2003).

Lawton et al., The Application of a Deterministic Ray Launching Algorithm for the Prediction of Radio Channel Characteristics in Small-Cell Environments, IEEE Transactions on Vehicular Technology, vol. 43, No. 4 p. 955-969 (Year: 1994).

Malik et al., Spatio-temporal ultrawideband indoor propagation modelling by reduced complexity geometric optics, IET Commun., 2007, 1, (4), pp. 751-759 (Year: 2007).

Son et al., A Deterministic Ray Tube Method for Microcellular Wave Propagation Prediction Model, IEEE Transactions on Antennas and Propagation, Aug. 1999, vol. 47, No. 8, p. 1344-1350 (Year: 1999).

Teh et al., An Improved Image-Based Propagation Model for Indoor and Outdoor Communications Channels, 2003, J. of Electromagn. Waves and Appl., vol. 17, No. 1, 31-50 (Year 2003).

Office action issued in U.S. Appl. No. 15/633,820, dated Jun. 28, 2019.

Office action issued in U.S. Appl. No. 15/633,820, dated Jan. 7, 2020.

Office action issued in U.S. Appl. No. 15/633,827, dated Oct. 8, 2020.

V. Degli-Esposti, J. S. Lu, E M. Vitucci, F. Fuschini, M. Barbiroli, J. Blaha, H. L. Bertoni, An Environment-Driven, Fully Discrete, Parallelized Ray-Launching Field Prediction Algorithm, European Cooperation in Science and Technology (Euro-COST), Graz, Austria, Sep. 13-14, 2017.

Office action issued in U.S. Appl. No. 15/633,827, dated Oct. 21, 2019.

Office action issued in U.S. Appl. No. 15/633,820, dated Oct. 4, 2019.

George Koutitas et al., Deployment Strategies and Energy Efficiency of Cellular Networks, IEEE Transactions on Wireless Communications, vol. 11, No. 7, Jul. 2012, p. 2552-2563 (Year: 2012).

\* cited by examiner

BOUNCED RAY TUBES WITH PREPROCESSING OF VISIBILITY

CROSS REFERENCE TO RELATED APPLICATIONS

This application is related to "Discrete Environment-Driven Ray Launching," U.S. application Ser. No. 15/633,820, and "Launching of ray tubes based on visibility from a transmitter," U.S. application Ser. No. 15/633,827, both filed on the same day as the present application and incorporated by reference herein.

FIELD OF THE INVENTION

The present invention relates to electromagnetic wave propagation modeling in general, and, more particularly, to bounced ray tubes with preprocessing of visibility.

BACKGROUND OF THE INVENTION

The modeling of electromagnetic wave propagation throughout an environment can be performed in order to characterize the effect of buildings, as well as that of other types of structures and objects in general, on signal propagation through the modeled environment. Wave propagation modeling can be performed for various reasons, including a need to understand existing telecommunications system coverage and a need to predict potential coverage configurations.

In a modeling of wave propagation, ray propagation methods are often used for analyzing signal propagation. Ray propagation methods include ray tracing and ray launching. Ray tracing is based on tracing signal paths from a first point to a second point. The rays are traced from the first point to the second point for determining which rays have impinged on the second point.

FIGS. 1A and 1B depict diagrams of the salient components of telecommunications system 100 in the prior art comprising cellular base station 101 and wireless terminal 102. Base station 101 and terminal 102 are in communication with each other via a transmission path or paths comprising one or more propagation components. A modeling of wave propagation in the downlink direction (i.e., from base station to terminal) involves considering base station 101 as a signal source, which is sometimes referred to as a "transmit point," and terminal 102 as the target, which is sometimes referred to as a "receive point." Within a ray-tracing context, as shown in FIG. 1A, one or more objects 103-1 through 103-4 are accounted for as to how rays 104-1 through 104-5 are received at the target from the signal source, by tracing each ray and starting from the target. Alternatively, one or more objects 103-1 through 103-4 can be accounted for by tracing each ray in the other direction (i.e., starting at base station 101 and tracing to terminal 102).

In contrast to ray tracing, ray launching in the prior art is a method in which a plurality of rays are launched in predetermined directions from the signal source such as base station 101. Because the base station location is the constant in all the communications links (to multiple terminals), the rays are always launched from it. As shown in FIG. 1B, the paths of many rays are considered in a forward direction (i.e., from the signal source), and not merely those rays that impinge on the target as in FIG. 1A. In ray launching, the simulation continues until a predetermined termination condition is met.

Ray tracing and ray launching techniques in the prior art have their relative advantages and disadvantages. For example, ray tracing is suitable for determining the receipt of signals at a particular target, such as wireless terminal 102, while ray launching is better suited for wide-area simulations—that is, simulations of radio signal coverage through a defined area, rather than at a particular point. Both classes of methods, however, are computationally intensive in that they require significant amounts of processing cycles, computer memory, and/or other resources, depending on the parameters of the simulation.

SUMMARY OF THE INVENTION

The present invention enables the pre-computing of the visibilities between the surfaces of structures within an environment being modeled. Two points are defined as being "visible" to each other if a straight line can be traced between the two points without intersecting any other object in the environment. The pre-computed results can then be utilized during a modeling run, particularly with regard to the launching of ray tubes between the surfaces. By pre-computing the visibilities in accordance with the techniques disclosed herein, an improvement is achieved over at least some ray launching techniques in the prior art, in that the amount of computational resources required for one or more modelings can be reduced.

In accordance with the illustrative embodiment of the present invention, a disclosed data-processing system receives a dataset that is representative of a plurality of structures within an environment. The plurality of structures is defined in the dataset as having a plurality of surfaces. Each structure can be a building or it can be some other type of object within the environment. The data-processing system then partitions each surface in the plurality of surfaces into a plurality of tiles. Each of the tiles of each surface has a reference point at a predetermined position within the tile.

As part of the pre-computing, the data-processing system determines whether i) the reference point of each corresponding tile in each plurality of tiles of each surface is visible or not from ii) the reference point of each possible spawning tile in each other plurality of tiles. An indication of the visibility of each corresponding tile from each possible spawning tile is stored.

The data-processing system then launches, or, more specifically, "projects," a first set of ray tubes from i) the reference point of a first spawning tile to ii) the tiles in a set of incident tiles belonging to a surface that is different from that of the first spawning tile. Each ray tube in the first set of ray tubes is defined by a corresponding tile in the set of incident tiles. Whether each ray tube in the first set of ray tubes is projected or not is based on i) a first ray tube that is incident on the first spawning tile and ii) the stored indication of the visibility of each of the corresponding tiles in the set of incident tiles from the first spawning tile.

At some point in the processing, the data-processing system evaluates the incidence of bounced ray tubes at a predetermined receive point within the environment. At least one of the bounced ray tubes in the evaluation can be based on at least one of the ray tubes projected in the first set. The data-processing system then presents a propagation result that is based on the evaluated incidence of the bounced ray tubes at the receive point.

In conceiving of the invention, the inventors had the insight that the surfaces of the structures could be partitioned into tiles and that the relationship between each spawning tile (i.e., a tile from which a ray tube can be projected) and each tile evaluated for visibility from the spawning tile could be pre-computed ahead of projecting the ray tubes for a given simulation or modeling run. The inventors realized that partitioning the surfaces into tiles, and then assessing visibility between reference points that are representative of the tiles, would enable the pre-computing of the visibilities between the surfaces, and that doing so would reduce the processing resources that are required. A scenario in which the number of processing cycles, for example, is decreased occurs when a ray tube is projected from a given spawning tile to a given incident tile or tiles multiple times during the course of the overall ray-tube processing associated with a given simulation run; when the visibility is pre-computed once, the pre-computed result can be re-used throughout the simulation. Among other reasons, pre-computation between tiles is possible because their relative positions do not change, at least as long as the structures themselves (e.g., their relative positions, their dimensions, etc.) within the dataset do not change.

An illustrative method for ray launching comprises: receiving, by a data-processing system, a dataset that is representative of a plurality of structures within an environment, wherein the plurality of structures is defined in the dataset as having a plurality of surfaces; partitioning, by the data-processing system, each surface in the plurality of surfaces into a plurality of tiles, wherein each of the tiles in the plurality of tiles of each surface has a reference point at a predetermined position within the tile; determining, by the data-processing system, whether i) the reference point of each corresponding tile in each plurality of tiles of each surface is directly visible or not from ii) the reference point of each possible spawning tile in each other plurality of tiles, wherein an indication of the visibility of each corresponding tile from each possible spawning tile is stored into a computer memory prior to any projecting of ray tubes that is based on visibility of one tile to another tile; projecting, by the data-processing system, a first nonempty set of ray tubes from i) the reference point of a first spawning tile to ii) the tiles in a set of incident tiles belonging to a surface that is different from that of the first spawning tile, wherein each ray tube in the first set of ray tubes is defined by a corresponding tile in the set of incident tiles, and wherein whether each ray tube in the first set of ray tubes is projected or not is based on i) a first ray tube that is incident on the first spawning tile and ii) the stored indication of the visibility of each of the corresponding tiles in the set of incident tiles from the first spawning tile; evaluating, by the data-processing system, an incidence of bounced ray tubes at a predetermined receive point within the environment, wherein at least one of the bounced ray tubes is based on at least one of the ray tubes projected in the first set of ray tubes; and presenting, by the data-processing system, a propagation result that is based on the evaluating of the incidence of bounced ray tubes.

Another illustrative method for ray launching comprises: receiving, by a data-processing system, a dataset that is representative of a first structure and a second structure within an environment, wherein the first structure and the second structure are defined in the dataset as having a first surface and a second surface, respectively; determining, by the data-processing system, whether a reference point within each corresponding tile in a second plurality of tiles into which the second surface is partitioned, is visible or not from a reference point of a first tile in a first plurality of tiles into which the first surface is partitioned, wherein an indication of the visibility of each corresponding tile from the first tile is stored into a computer memory; projecting, by the data-processing system, a first nonempty set of ray tubes from the reference point of the first tile to the tiles in the second plurality of tiles, wherein each ray tube in the first set is defined by a corresponding tile in the second plurality, and wherein whether each ray tube in the first set is projected or not is based on i) a first ray tube that is incident on the first tile and ii) the stored indication of the visibility of each of the corresponding tiles in the second plurality from the first tile; evaluating, by the data-processing system, an incidence of bounced ray tubes at a predetermined receive point within the environment, wherein at least one of the bounced ray tubes is based on at least one of the ray tubes projected in the first set; and presenting, by the data-processing system, a propagation result that is based on the evaluating of the incidence of bounced ray tubes.

Yet another illustrative method for ray launching comprises: receiving, by a data-processing system, a dataset that is representative of a first structure and a second structure within an environment, wherein the first structure and the second structure are defined in the dataset as having a first surface and a second surface, respectively; partitioning, by the data-processing system, the first surface into a first plurality of tiles and the second surface into a second plurality of tiles, wherein each of the tiles in the first plurality and in the second plurality has a center point at the center of the tile; determining, by the data-processing system, whether the center point of each corresponding tile in the second plurality of tiles is directly visible or not from the center point of a first tile in the first plurality of tiles, wherein an indication of the visibility of each corresponding tile from the first tile is stored into a computer memory; projecting, by the data-processing system, a first nonempty set of ray tubes from the center point of the first tile to the tiles in the second plurality of tiles, wherein whether each ray tube in the first set is projected or not is based on i) a first ray tube that is incident on the first tile and ii) the stored indication of the visibility of each of the corresponding tiles in the second plurality from the first tile; evaluating, by the data-processing system, an incidence of bounced ray tubes at a predetermined receive point within the environment, wherein at least one of the bounced ray tubes is based on at least one of the ray tubes projected in the first set; and presenting, by the data-processing system, a propagation result that is based on the evaluating of the incidence of bounced ray tubes.

DETAILED DESCRIPTION

Figure 1A:
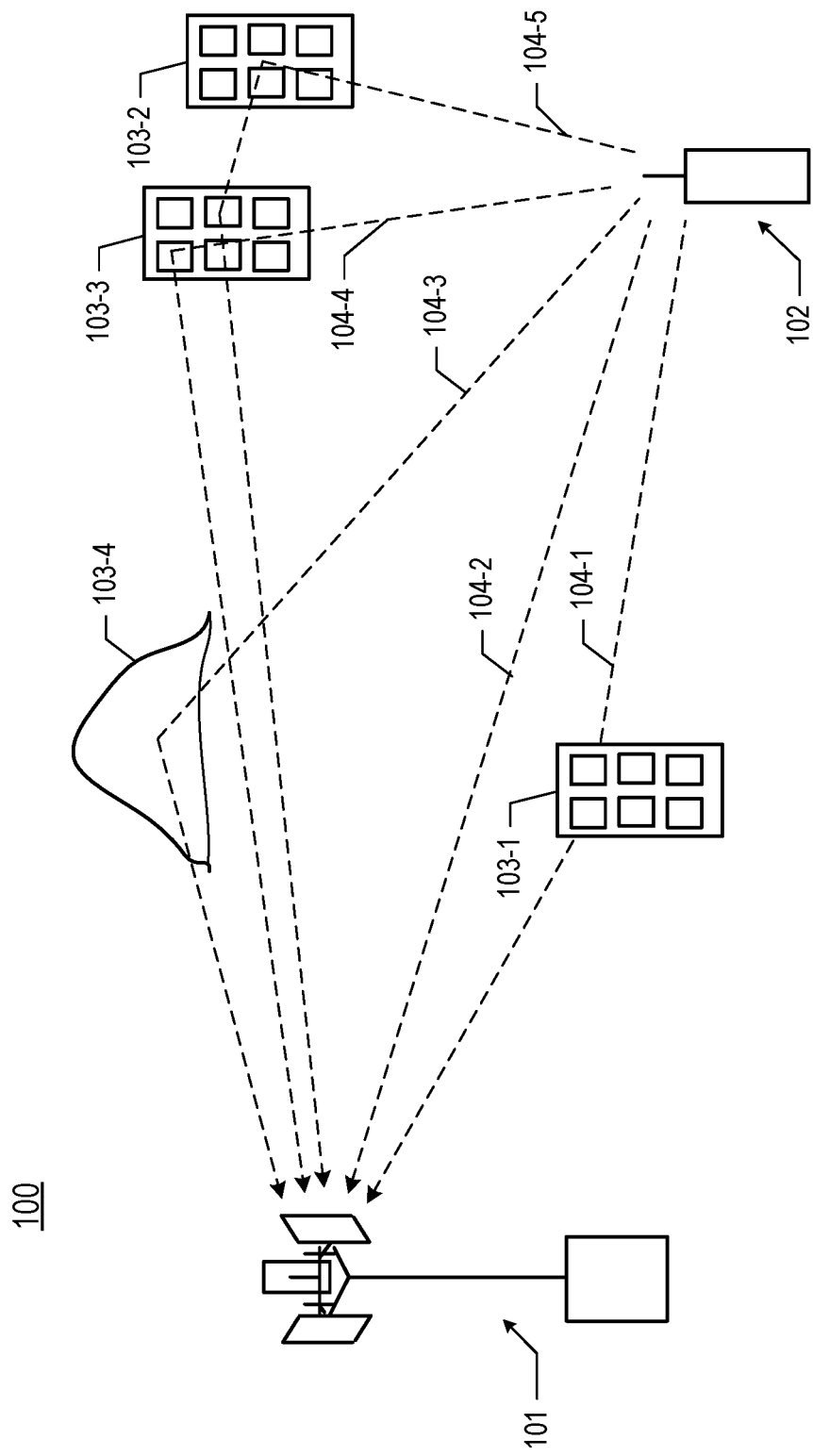
FIGS. 1A and 1B depict diagrams of the salient components of telecommunications system 100 in the prior art comprising cellular base station 101 and wireless terminal 102.
Figure 1B:
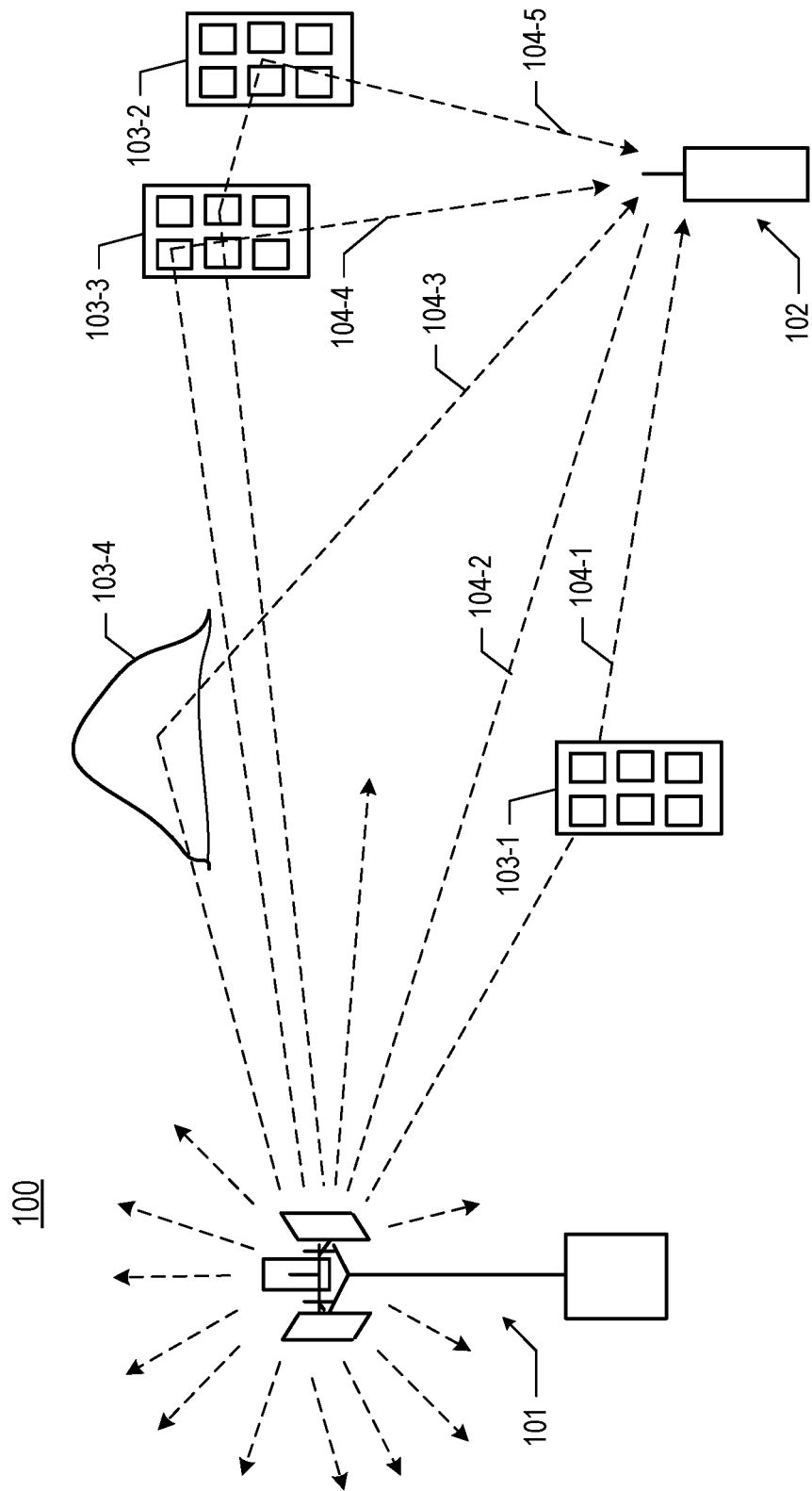

Based on—For the purposes of this specification, the phrase "based on" is defined as "being dependent on" in contrast to "being independent of". The value of Y is dependent on the value of X when the value of Y is different for two or more values of X. The value of Y is independent of the value of X when the value of Y is the same for all values of X. Being "based on" includes both functions and relations.

Bounce—For the purposes of this specification, the infinitive "to bounce" and its inflected forms (e.g., "bouncing", etc.) is defined as to cause something to move away from a surface after hitting it.

Dataset—For the purposes of this specification, the phrase "dataset" is defined as a collection of data. A dataset can originate from an organized collection of data, such as a database.

Determine—For the purposes of this specification, the infinitive "to determine" and its inflected forms (e.g., "determining", "determination", etc.) should be given the ordinary and customary meaning that the terms would have to a person of ordinary skill in the art at the time of the invention.

Edge—For the purposes of this specification, the phrase "edge" is defined as the outside limit of an object (e.g., a polygon, etc.), area, or surface.

Environment—For the purposes of this specification, the phrase "environment" is defined as the aggregate of surrounding things, conditions, and/or influences.

Evaluate—For the purposes of this specification, the infinitive "to evaluate" and its inflected forms (e.g., "evaluating", "evaluation", etc.) should be given the ordinary and customary meaning that the terms would have to a person of ordinary skill in the art at the time of the invention.

Footprint—For the purposes of this specification, the phrase "footprint" is defined as the area on a surface covered by something, such as by a polyhedron that is representative of a structure in a dataset.

Height—For the purposes of this specification, the phrase "height" is defined as measurement from base to top. The height of an object, such as a polyhedron, is defined as measurement from the base of the object to the top of the object.

Outline—For the purposes of this specification, the phrase "outline" is defined as a line or set of lines enclosing or indicating the shape of an object.

Overlap—For the purposes of this specification, the infinitive "to overlap" and its inflected forms (e.g., "overlapping", etc.) is defined as to have an area or range in common with.

Partition—For the purposes of this specification, the infinitive "to partition" and its inflected forms (e.g., "partitioning", etc.) is defined as to divide up into parts.

Polygon—For the purposes of this specification, the phrase "polygon" is defined as a closed plane figure having at least three sides (edges). In some embodiments of the present invention, the sides are straight.

Polyhedron—For the purposes of this specification, the phrase "polyhedron" is defined as a solid in three dimensions with flat polygonal faces, straight edges and sharp corners or vertices. A "neighbor polyhedron" is defined as a polyhedron that is within a predetermined distance from another polyhedron.

Present—For the purposes of this specification, the infinitive "to present" and its inflected forms (e.g., "presenting", "presentation", etc.) should be given the ordinary and customary meaning that the terms would have to a person of ordinary skill in the art at the time of the invention.

Project—For the purposes of this specification, the infinitive "to project" and its inflected forms (e.g., "projecting", "projection", etc.) is defined as to cause something to move forward or outward. The phrase "to project to" is defined as "to project all the way to," while the phrase "to project toward" is defined as "to project in the direction of."

Ray tube—For the purposes of this specification, the phrase "ray tube" is defined as a container for rays with similar geometric properties.

Receive—For the purposes of this specification, the infinitive "to receive" and its inflected forms (e.g., "receiving", "reception", etc.) should be given the ordinary and customary meaning that the terms would have to a person of ordinary skill in the art at the time of the invention.

Structure—For the purposes of this specification, the phrase "structure" is defined as something built or constructed, such as a building, bridge, dam, or machine, for example and without limitation. For the purposes of this specification, the phrase "building" is defined as a structure with a roof and walls, such as a dwelling, house, school, store, or factory, for example and without limitation.

Surface—For the purposes of this specification, the phrase "surface" is defined as a continuous set of points that has length and breadth but no thickness.

Tile—For the purposes of this specification, the phrase "tile" is defined as a plane shape, such as certain types of polygons, used in tiling, which is a way of arranging identical plane shapes so that they completely, or at least substantially, cover an area without overlapping. For the purposes of this specification, the phrase "spawning tile" is defined as a tile that a projected ray tube can be or is bounced off of. For the purposes of this specification, the phrase "incident tile" is defined as a tile that a projected ray tube can be or is incident on.

Transmit—For the purposes of this specification, the infinitive "to transmit" and its inflected forms (e.g., "transmitting", "transmission", etc.) should be given the ordinary and customary meaning that the terms would have to a person of ordinary skill in the art at the time of the invention.

Vertex—For the purposes of this specification, the phrase "vertex" is defined as a point where two or more curves, lines, or edges meet.

Wall—For the purposes of this specification, the phrase "wall" is defined as a side of a building or room.

Figure 2:
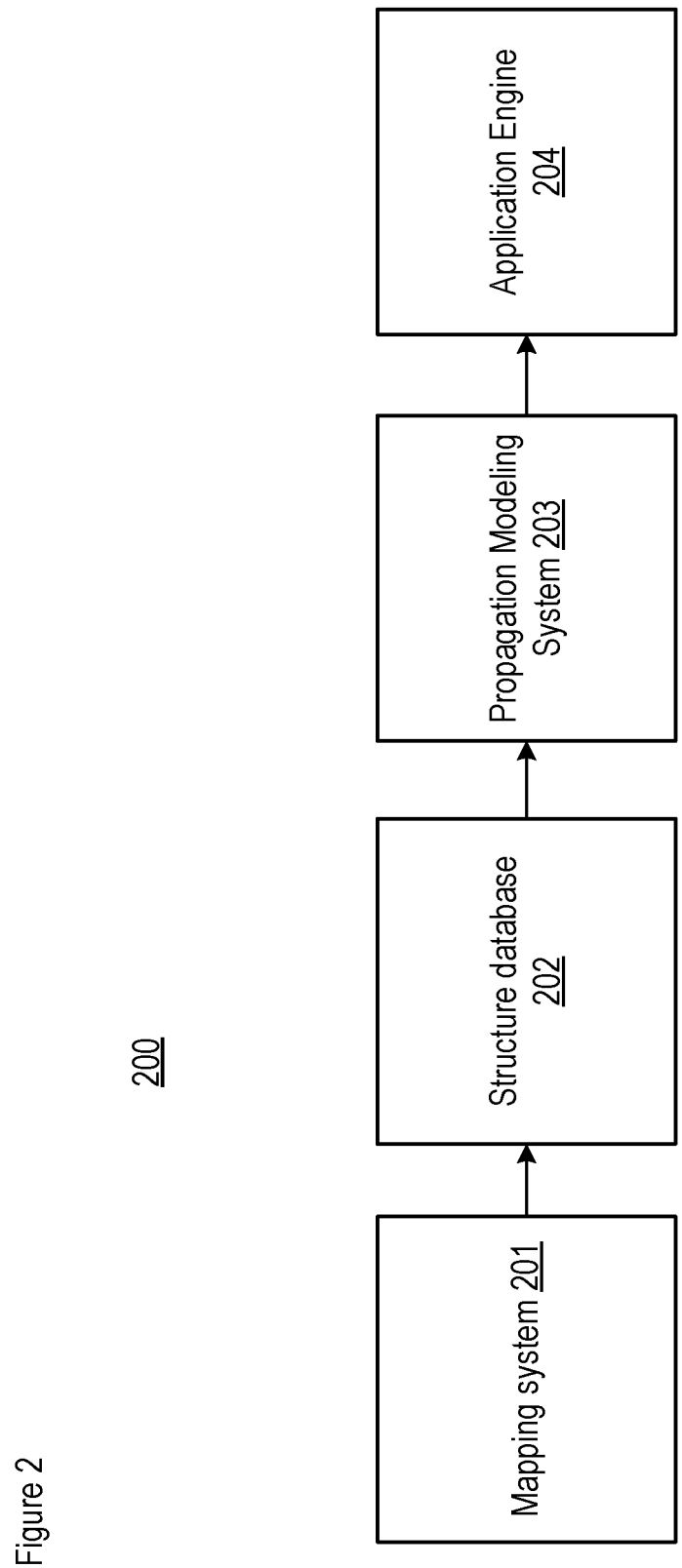
FIG. 2 depicts a diagram of the salient components of data creation and modeling system 200, in accordance with the illustrative embodiment of the present invention.

FIG. 2 depicts a diagram of the salient components of data creation and modeling system 200, in accordance with the illustrative embodiment of the present invention. Data creation and modeling system 200 comprises: mapping system 201, structure database 202, propagation modeling system 203, and application engine 204 which are interrelated as shown.

For illustrative purposes, system 200 features electromagnetic wave propagation modeling, particularly that of radio waves. As those who are skilled in the art will appreciate, however, after reading this specification, system 200 can be used for a purpose that is different than propagation modeling, including other types of modeling, simulation, prediction, and computer graphics processing. Additionally, the electromagnetic waves in the propagation modeling can be different than radio waves (e.g., heat, visible light, x-rays, gamma radiation, etc.). For example and without limitation, system 200 can be used in computer graphics processing, particularly for determining lighting and shadowing when rendering scenes, wherein visible light is the electromagnetic radiation under consideration.

Also for illustrative purposes, system 200 uses data that represents one or more buildings within an environment, in the processing of the environment data as part of electromagnetic wave propagation modeling. As those who are skilled in the art will appreciate, however, after reading this specification, the data can represent structures that are different from buildings, or can represent other objects that are representable with polyhedrons. Furthermore, the use of the data can be for a purpose that is different than propagation modeling, including other types of modeling, simulation, and prediction.

The structure data that is used by system 200 is specified in terms of polyhedrons, in which one or more polyhedrons make up each building or other type of structure. Each polyhedron, in turn, is defined by both an ordered set of vertices and a height. Each vertex in the ordered set is represented using coordinates, and the set itself defines a polygon footprint of the polyhedron being defined. Some of these types of polyhedrons are referred to as "prisms" that have a polygon footprint and vertical walls.

In particular, the type of polyhedron that is handled by system 200 in the illustrative embodiment is a "right prism." A right prism is a geometric solid that has a polygon as its base and vertical sides perpendicular to the base. As those who are skilled in the art will appreciate after reading this specification, however, at least some other types of polyhedrons that are different from right prisms can be handled by at least some of the techniques disclosed herein; such polyhedrons include oblique prisms and non-prismatic polyhedrons, for example and without limitation. Furthermore, as those who are skilled in the art will appreciate after reading this specification, at least some other types of solids in three dimensions that are different than polyhedrons can be handled by at least some of the techniques disclosed herein; such geometric solids include cylinders, cones, spheres, and tori, for example and without limitation. As a non-limiting example, the circular base of a cylinder, cone, hemisphere, or hemi-torus can be used instead of the polygonal base of a polyhedron (i.e., a "circular footprint" instead of a "polygon footprint" as described below), in some alternative embodiments of the present invention.

Mapping system 201 is responsible for the creation of structure data, in well-known fashion. System 201 features the capture of imagery of buildings and/or other terrestrial structures and details. System 201 comprises hardware and software that provides imagery over a given terrestrial surface area. The imaging devices include imaging satellites and unmanned aerial vehicles (UAV) such as macro UAVs and micro drones, for example and without limitation. Because the limitations of these sources of the structure data are well understood and quantifiable, the data itself can be characterized as being at a particular resolution of detail. Similarly, the data can be also characterized in terms of horizontal and/or vertical accuracies, in that each point (e.g., vertex, etc.) specified can deviate from its true position according to a specified accuracy.

Structure database 202 is responsible for receiving and maintaining one or more datasets of structure data, in well-known fashion. Database 202 features the organizing and storage of imagery of buildings and/or other terrestrial structures and details, in the form of polyhedrons. Database 202 comprises hardware and software that provides datasets of buildings and other structures. For example and without limitation, Database 202 can include at least a portion of a geographical information system (GIS) database as is known in the art. The type of data that can be provided to propagation modeling system 203 can comprise terrain data and building data.

Propagation modeling system 203 is responsible for propagation modeling, or for a different type of processing, using the environment data received from system 203, and the presentation of the modeling results, in accordance with the illustrative embodiment. System 203 comprises hardware and software that uses the structure data acquired from structure database 202, as described below and in the accompanying figures. In some embodiments of the present invention, system 203 operates on simplified data in which polyhedrons that represent structures in the environment have been reduced, while in some other embodiments system 203 operates on non-simplified data. System 203 is described below and with respect to FIG. 3.

In accordance with the illustrative embodiment, propagation modeling system 203 communicates with structure database 202 and application engine 204 via a local area network. It will, however, be clear to those skilled in the art, after reading this disclosure, how to make and use alternative embodiments of the present invention in which propagation modeling system 203 communicates with one or more of the entities depicted in FIG. 2 via a different network. The network can be, for example, the Internet, the Public Switched Telephone Network (PSTN), a wide area network, and so on.

Application engine 204 is responsible for applying the modeling results received from system 203, and the presentation of the results of the application, in accordance with the illustrative embodiment. As depicted, engine 204 executes on a data-processing system that comprises hardware and software. In some alternative embodiments, application engine 204 can be realized in the form of software and/or hardware within propagation modeling system 203 itself (e.g., within data-processing system 301 described below, etc.).

Figure 3:
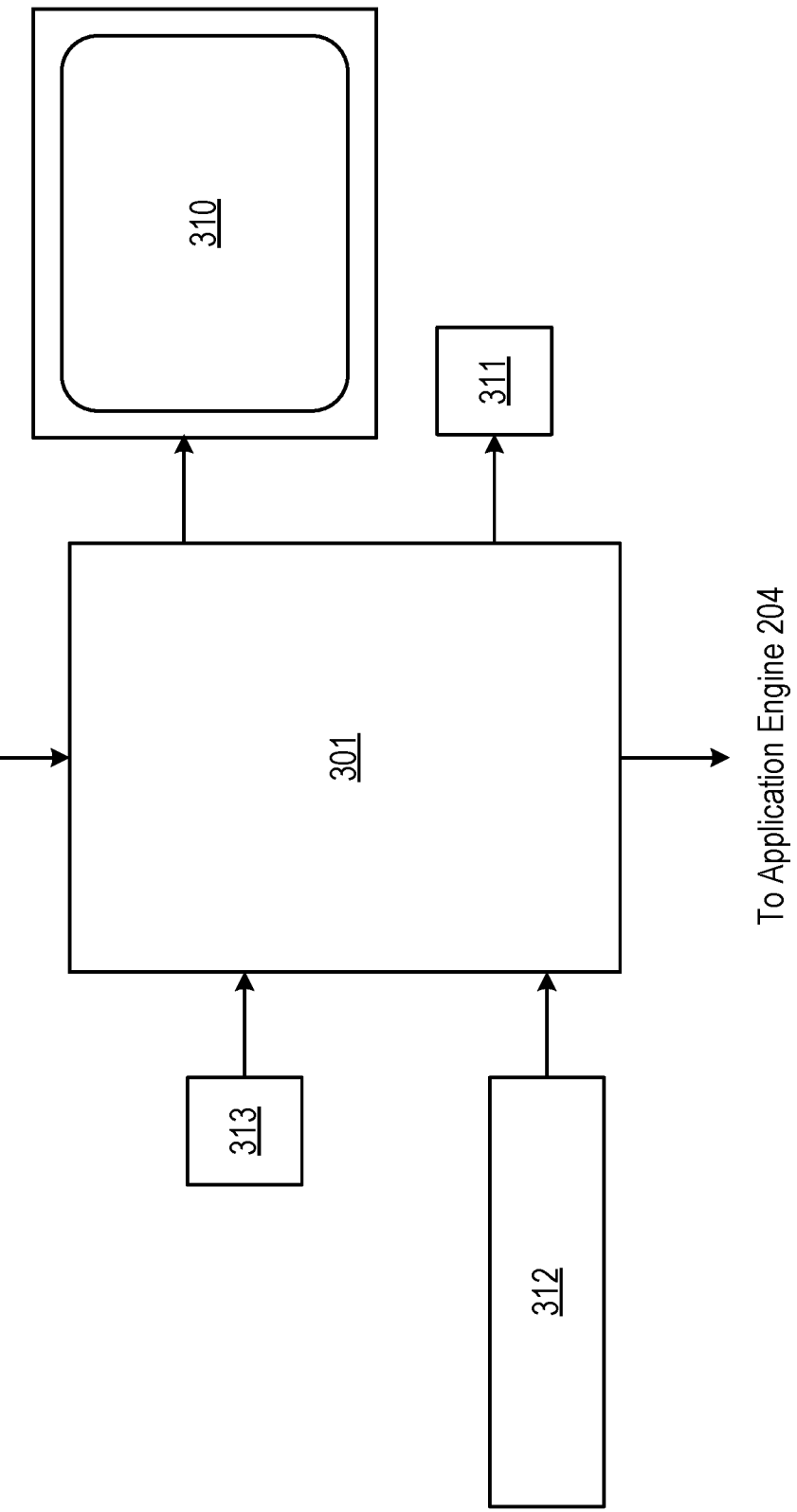
FIG. 3 depicts a block diagram of the salient components of propagation modeling system 203 within system 200.

FIG. 3 depicts a block diagram of the salient components of propagation modeling system 203, in accordance with the illustrative embodiment. Propagation modeling system 203 comprises: data-processing system 301, video display 310, speaker 311, keyboard 312, and pointing device 313, interconnected as shown.

Data-processing system 301 is a general-purpose computer that comprises a processor, memory, and input and output interfaces for a user interface. Data-processing system 301 is capable of performing the tasks described below. Data-processing system 301:
i. receives one or more datasets from structure database 202, and
iii. receives a keyboard signal from keyboard 312, comprising a user input control, and
iii. receives a pointing and command signal from pointing device 313, comprising a user input control, and
iv outputs a video signal to video display 310 to present results of propagation modeling, including displayable objects in the modeled environment, and
v. outputs a speaker signal to speaker 311.
Data-processing system 301 is further depicted in FIG. 4.

Video display 310 is a display device (e.g., a monitor, etc.) as is well known in the art that receives a video signal and creates a visual image of the signal for presentation to a user. In accordance with the illustrative embodiment, display 310 receives the signals that are generated as described below and presents modeling results based on the data received from system 202. It will be clear to those skilled in the art, after reading this specification, how to make and use video display 310.

Speaker 311 is an electro-acoustic transducer as is well known in the art that receives a speaker signal and creates an audible sound of the signal for a user. It will be clear to those skilled in the art, after reading this specification, how to make and use speaker 311.

Keyboard 312 is a character input device as is well known in the art that receives input from a user and transmits keyboard signals representing that input. It will be clear to those skilled in the art, after reading this specification, how to make and use keyboard 312.

Pointing device 313 is a spatial input device (e.g., a mouse, a joystick, a touchpad, a stylus, etc.) as is well known in the art that receives spatial and command (e.g., button, wheel, etc.) input from a user and that transmits pointing and command signals representing that input. It will be clear to those skilled in the art, after reading this specification, how to make and use pointing device 313.

In accordance with the illustrative embodiment, propagation-modeling system 203 performs at least some of the tasks described below. As those who are skilled in the art will appreciate after reading this specification, however, a different system can perform some or all of said tasks.

Figure 4:
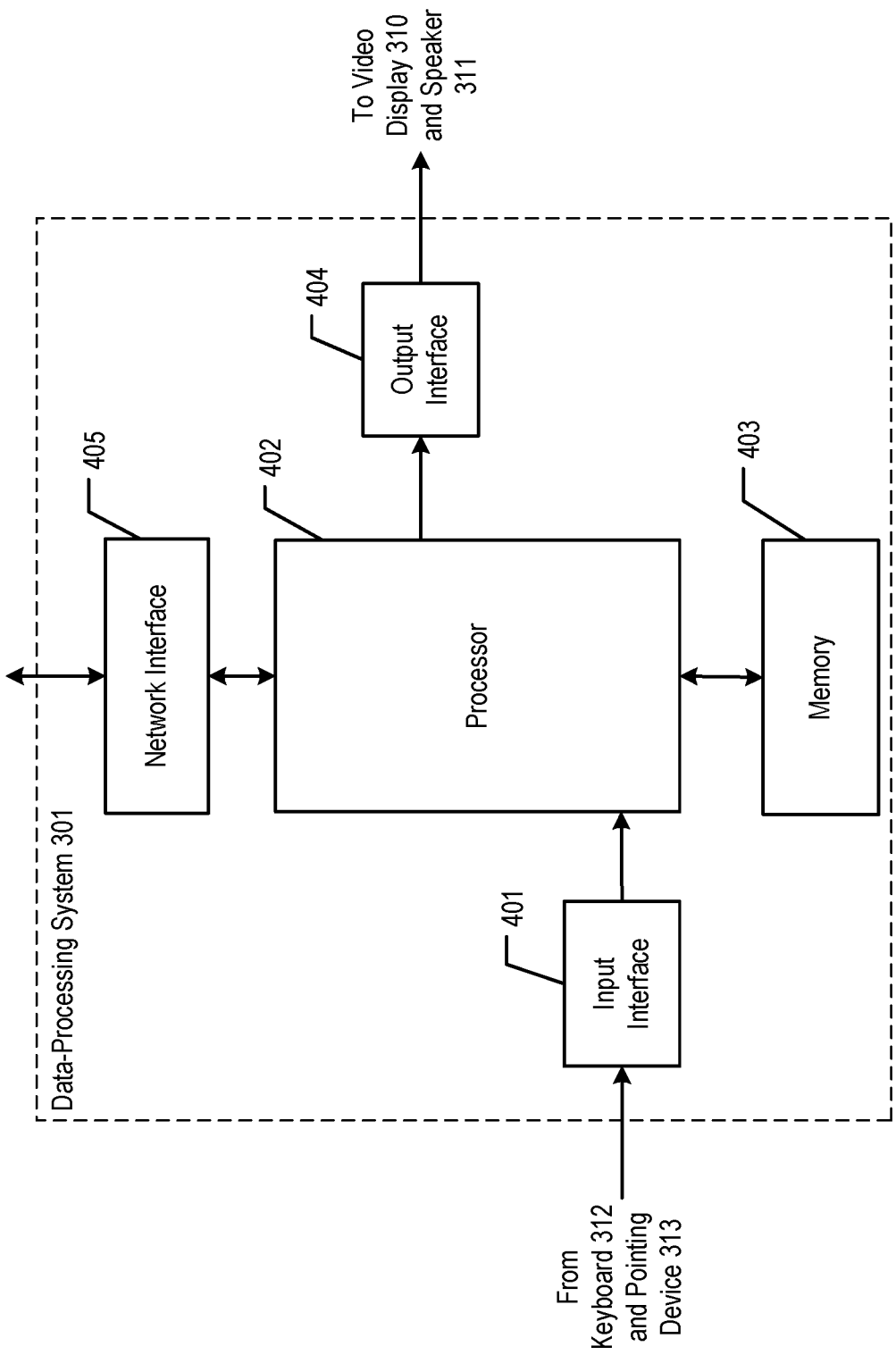
FIG. 4 depicts a block diagram of the salient components of data-processing system 301 within system 203.

FIG. 4 depicts a block diagram of the salient components of data-processing system 301, in accordance with the illustrative embodiment. Data-processing system 301 is a corrupting device and comprises input interface 401, processor 402, memory 403, output interface 404, and network interface 405 interconnected as shown. In accordance with the illustrative embodiment, data-processing system 301 is a personal computer.

Input interface 401 receives signals from keyboard 312 and pointing device 313, and forwards the information encoded in the signals to processor 402. It will be clear to those skilled in the art, after reading this specification, how to make and use input interface 401.

Processor 402 is a general-purpose processor that is capable of: receiving information from input interface 401; reading data from and writing data into memory 403; executing at least some of the tasks described below; and transmitting information to output interface 404. In some alternative embodiments of the present invention, processor 402 might be or might comprise a special-purpose processor, such as a graphics-processing unit (GPU). In either case, it will be clear to those skilled in the art, after reading this specification, how to make and use processor 402.

Memory 403 stores data and executable instructions, is a combination of volatile and non-volatile memory, and is non-transitory. It will be clear to those skilled in the art, after reading this specification, how to make and use memory 403.

Output interface 404 receives information from processor 402, and outputs signals that encode this information to video display 310 and speaker 311. In some embodiments, output interface 404 can be built into a video card, which can be used to offload at least some of the processing from processor 402. It will be clear to those skilled in the art, after reading this specification, how to make and use output interface 404.

Network interface 405 receives one or more datasets from structure database 202. In some alternative embodiments of the present invention, the datasets are made available to data-processing system 301 through other means. It will be clear to those skilled in the art, after reading this specification, how to make and use network interface 305.

As those who are skilled in the art will appreciate after reading this specification, the hardware platform performing at least some of the tasks performed by data-processing system 301 can be embodied as a multi-processor platform, as a sub-component of a larger computing platform, as a virtual computing element, or in some other computing environment—all within the scope of the present invention. The steps described herein can be performed in a single processor, or distributed across multiple processors. Furthermore, data-processing system 301 can be a type of apparatus different than a personal computer, such as a server computer, and can be referred to by a different name such as a computer system, a computing device, or another type of hardware platform that comprises one or more processors, one or more memories, and one or more network interfaces, for example and without limitation.

Figure 5:
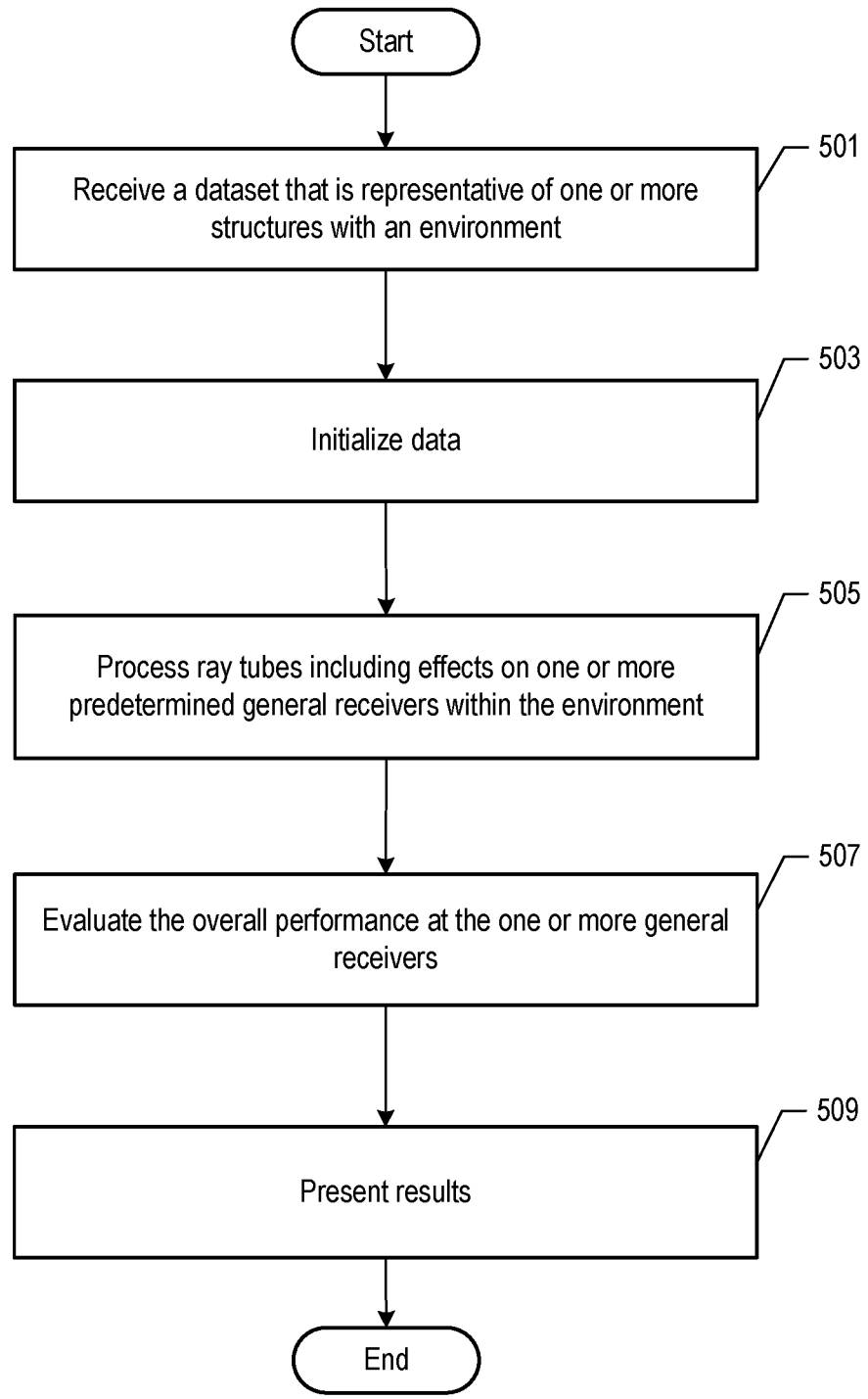
FIG. 5 depicts a flowchart of the salient processes of method 500 for performing ray launching, performed in accordance with the illustrative embodiment.

FIG. 5 depicts a flowchart of the salient processes of method 500 for performing ray launching, performed in accordance with the illustrative embodiment and comprising operations that are depicted in a particular order. It will be clear to those having ordinary skill in the art, after reading the present disclosure, how to make and use alternative embodiments of method 500, as well as the other methods disclosed in this specification, wherein the recited operations sub-operations, and messages are differently sequenced, grouped, or sub-divided—all within the scope of the present disclosure. It will be further clear to those skilled in the art, after reading the present disclosure, how to make and use alternative embodiments of the disclosed methods wherein some of the described operations, sub-operations, and messages are optional, are omitted, or are performed by other elements and/or systems.

For pedagogical purposes, the operations associated with the disclosed system and method are presented as being sequentially performed. As those who are skilled in the art will appreciate after reading this specification, at least some of the operations disclosed herein can be performed in parallel with one another. For example and without limitation, the processing that is associated with a given tile or a given ray can be performed concurrently for multiple tiles or multiple rays, respectively.

The propagation modeling techniques disclosed in FIG. 5 and related figures are depicted as being performed by data-processing system 301 within propagation modeling system 203. As those who are skilled in the art will appreciate after reading this specification, however, these disclosed techniques can be performed elsewhere.

In accordance with operation 501, data-processing system 301 receives dataset 600, which is described below and is representative of one or more structures within an environment. Each structure can be defined by one or more polyhedrons, each of which having a footprint defined by a polygon (i.e., a "polygon footprint"). Each polygon, in turn is made up of vertices and edges. In some embodiments of the present invention, the dataset is characterized as having a predetermined error. The predetermined error can be characterized in terms of a particular resolution in the data (e.g., 1 meter, 2 meters, 5 meters, 6 meters, 10 meters, 15 meters, 20 meters, 25 meters, 30 meters, etc.), a particular accuracy in terms of how each vertex point has been specified horizontally and/or vertically in relation to its true position, or something else.

Figure 6:
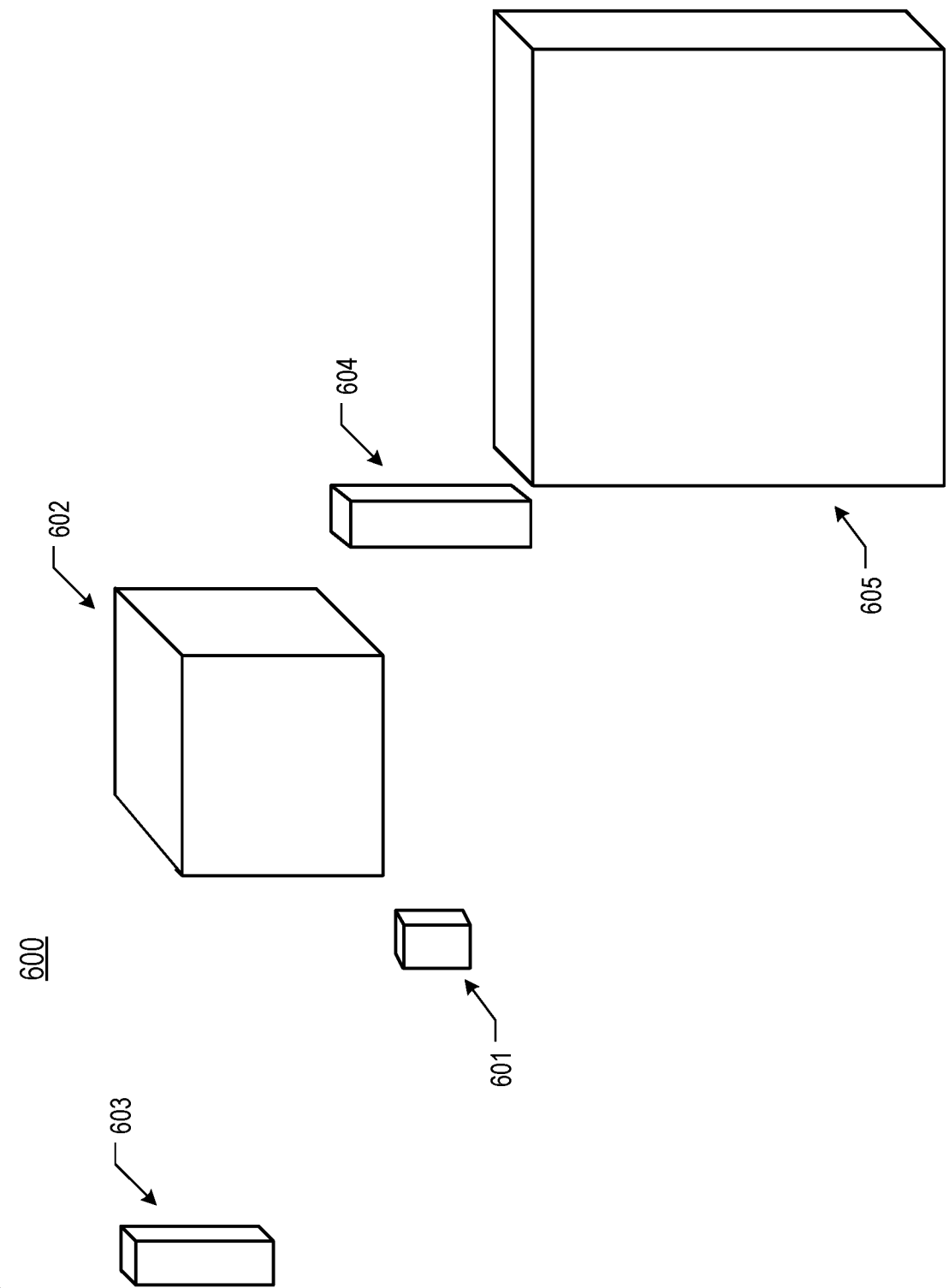
FIG. 6 depicts a visualization of dataset 600.

FIG. 6 depicts a visualization of dataset 600. Dataset 600 is representative of one or more structures within an environment, including structures 601 through 605. Each structure in dataset 600 is defined as having one or more surfaces (e.g., a first surface, a second surface, etc.). In turn, each surface can be partitioned mathematically into one or more tiles, as described below and in regard to FIG. 8.

Each structure can be defined in dataset 600 in terms of one or more polyhedrons, wherein each polyhedron is defined in part as having a polygon footprint. As those who are skilled in the art will appreciate after reading this specification, however, footprints of at least some other types of plane figures (e.g., circles, etc.) that correspond to least some other types of geometric solids different than polyhedrons can be handled by at least some of the techniques disclosed herein. Moreover, such footprints can be defined in dataset 600 by features other than vertices, as those who are skilled in the art will appreciate after reading this specification; for example, a circle can be defined by its center point and radius.

In accordance with the illustrative embodiment, the two vertices in the lower corners of the wall and a height component define a vertical wall of a polyhedron. As those who are skilled in the art will appreciate after reading this specification, however, the two vertices in the upper corners can be used along with a height component.

In accordance with the illustrative embodiment, structures 601 through 605 are buildings, wherein each of the buildings comprises multiple exterior sides. As those who are skilled in the art will appreciate after reading this specification, however, one or more structures represented in dataset 600 can be structures other than buildings (e.g., free-standing walls, bridges, machines, objects for transporting other objects, natural objects, etc.). For each structure that is a building, each surface is defined by a corresponding, exterior side of the building.

In accordance with operation 503, data-processing system 301 initializes at least some of the data used in performing ray launching. Operation 503 is described below and in regard to FIG. 7.

In accordance with operation 505, data-processing system 301 processes ray tubes, including projecting one or more ray tubes in accordance with the illustrative embodiment. As part of operation 505, system 301 processes the effects of one or more of the ray tubes on one or more predetermined general receivers, or other receive points, within the environment being modeled. Operation 505 is described below and in regard to FIG. 10.

In accordance with operation 507, data-processing system 301 evaluates the overall performance experienced, in terms of signal strength (e.g., ray power, etc.) at the one or more predetermined receive points within the environment being modeled. In particular, system 301 can evaluate an incidence of bounced ray tubes at the one or more receive points within the environment, wherein at least one of the bounced ray tubes is based on at least one of the ray tubes projected in accordance with operation 505, for one or more sets of projected ray tubes. For example and without limitation, evaluating such an incidence can amount to combining each result of operation 1003 for a given receive point, which is described below and in regard to FIG. 10, and doing so for one or more of the receive points. System 301 determines an overall performance value or values for the receive point based on the one or more intermediate results accumulated in operation 1003. For example and without limitation, system 301 can add the intermediate results, or values based on the intermediate results, together and treat the sum as the overall result for the receive point being considered.

In accordance with the illustrative embodiment, data-processing system 301 evaluates performance in regard to signal strength. However, as those who are skilled in the art will appreciate after reading this specification, system 301 can evaluate the performance experience at one or more of the given receive points in terms of other signal characteristics such as propagation delay, for example and without limitation.

In accordance with operation 509, data-processing system 301 presents the result or results obtained at operation 507. For example and without limitation, system 301 can present a propagation result that is based on the evaluating performed in accordance with operation 507.

In some embodiments of the present invention, system 301 presents the result to a user via display 310. In some other embodiments of the present invention, system 301 transmits the results to application engine 204. In some embodiments of the present invention, system 201 in essence "transmits" the data by making it available to a software process used to implement the processing associated with application engine 204. Engine 204 can take the result and, based on the result, modify an engineering parameter (e.g., a radio frequency [RF] parameter, etc.) that affects the environment, which can provide an improvement in a wireless telecommunication network's ability to handle wireless traffic within the environment.

Figure 7:
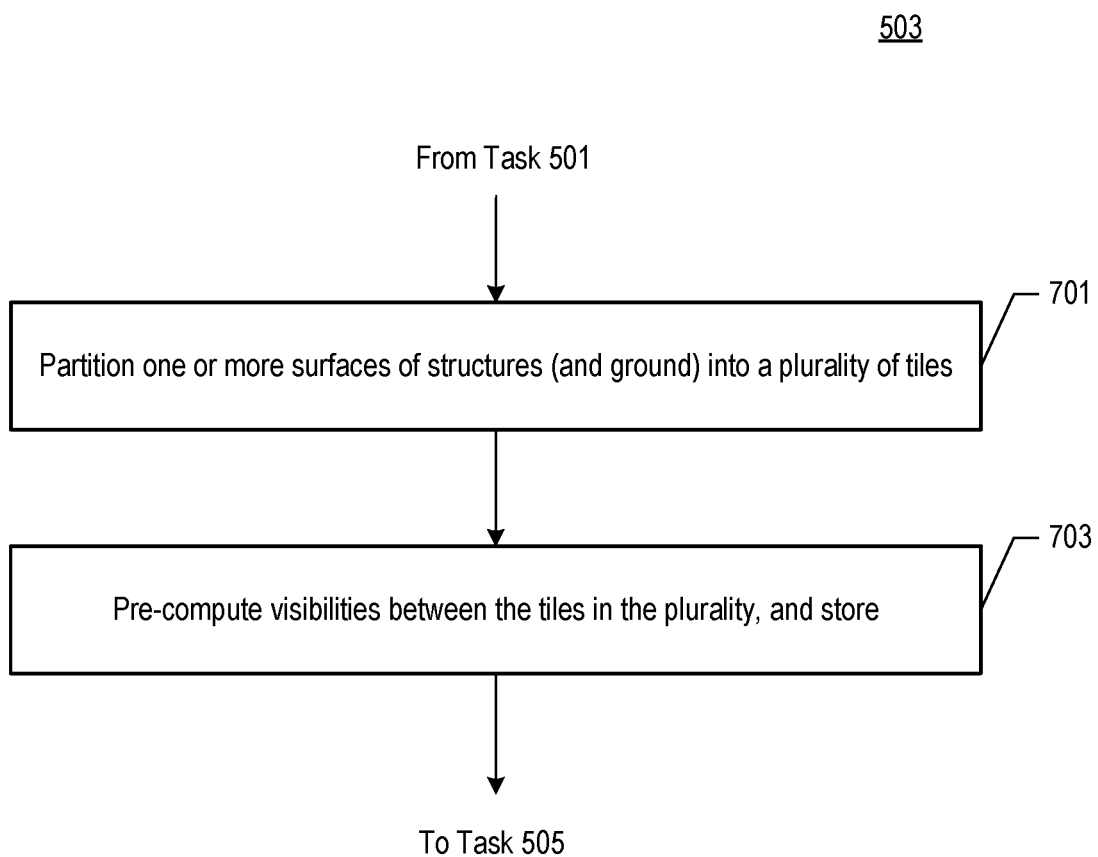
FIG. 7 depicts the sub-operations within operation 503, related to initializing at least some of the data used for ray launching.

FIG. 7 depicts the sub-operations within operation 503, related to initializing at least some of the data used for ray launching. In accordance with operation 701, data-processing system 301 partitions mathematically (i.e., "tiles") one or more surfaces of structures 601 through 605 into one or more pluralities of tiles, wherein each tile has a predetermined shape. In partitioning the surfaces of the structures into tiles, it can be said that data-processing system 301 "discretizes" the surfaces. In some embodiments of the present invention, system 301 can partition other surfaces of other features within dataset 600 such as some or all of the ground surrounding the structures; furthermore, the tiles partitioned on the ground on other features can be processed in the same way as the tiles partitioned on structures, as disclosed herein.

Figure 8:
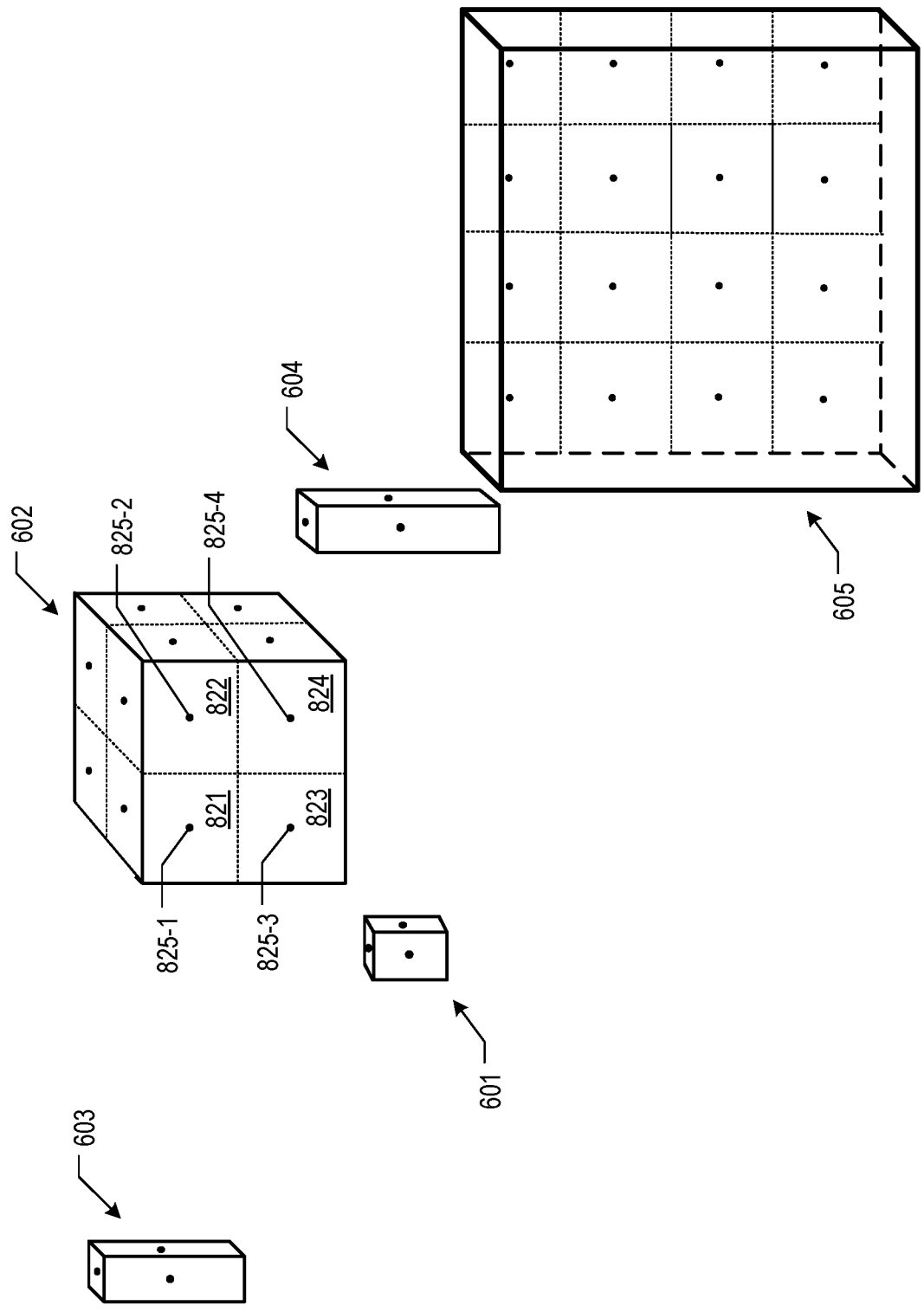
FIG. 8 depicts each of structures 601 through 605 partitioned into at least one tile per surface.

As can be seen in FIG. 8, each of structures 601 through 605 are partitioned into at least one tile per surface. For example, structure 602, a building, is partitioned into four tiles per each surface visible in the drawing, including i) tiles 821 through 824 that are part of the same exterior side (or wall) of the building and ii) another set of tiles that are part of the roof of the building. Each tile in the partitioning is created to have a particular shape. For example and without limitation, each of tiles 821 through 824 has a square shape. There are other tiles depicted in FIG. 8 as having a non-square, rectangular shape. As those who are skilled in the art will appreciate after reading this specification, the created tiles can have a shape that is one of a different type of polygon such as a regular triangle and a regular hexagon, for example and without limitation.

In some embodiments of the present invention, the shape of one or more tiles can be based on the outline of the exterior side of a building that defines the corresponding surface of the building, or other structure. For example and without limitation, if the outline of an exterior side of a building is in the shape of a rectangle, then one or more of the tiles created during the partitioning of that surface can be created in the shape of the rectangle suggested by the outline of the exterior side. Tiles on different surfaces and/or structures can have different shapes that are based on respective outlines of the different surfaces and/or structures, or the tiles on the different surfaces and/or structures can all be the same shape. In at least some embodiments of the present invention, the partitioning (e.g., shape, surface area, etc.) is independent of any transmit point being used in any modeling associated with the ray launching of the illustrative embodiment.

In accordance with the illustrative embodiment, all of the tiles of a given surface have the same shape. In some embodiments of the present invention, however, different tiles of a given surface can have different shapes. In accordance with the illustrative embodiment, the tiles of a first surface are of one shape, whereas the tiles of a second surface (e.g., of the same structure, of a different structure, etc.) are of a different shape than that of the tiles on the first surface. In some embodiments of the present invention, however, the tiles of two different surfaces (e.g., on the same building, on two different buildings, etc.) can be of the same shape.

In regard to the surface area of a tile, in accordance with the illustrative embodiment, all of the tiles of a given surface have substantially the same area (e.g., within one percent of each other, etc.). In some embodiments of the present invention, however, different tiles of a given surface can have substantially different areas (e.g., greater than one percent difference, etc.). In accordance with the illustrative embodiment, the tiles of two different surfaces (e.g., on the same building, on two different buildings, etc.) can have substantially the same area. In some embodiments of the present invention, however, the tiles of a first surface are of one area, whereas the tiles of a second surface (e.g., of the same structure, of a different structure, etc.) are of a different area than that of the tiles on the first surface.

Each tile created in the partitioning of each surface has a reference point at a predetermined position within the tile. For example, tiles 821 through 824 have reference points 825-1 through 825-4, respectively. In accordance with the illustrative embodiment, each reference point depicted is a center point at the center of the tile. The center of the tile can be defined, for example, as being substantially equidistant (e.g., with one percent of the theoretical equidistant point, etc.) from each vertex of the particular regular polygon that is the shape of the tile. In accordance with the illustrative embodiment, the reference point is defined in the same way across a plurality of tiles (e.g., on a given surface of a structure, on all surfaces of a structure, on all surfaces of all structures, etc.).

In accordance with operation 703 in FIG. 7, data-processing system 301 precomputes visibilities between the tiles partitioned in accordance with operation 701, and stores indications (i.e., "visible", "not visible") of the visibilities from each possible spawning tile (i.e., "first tile") to one or more other tiles, into memory 403. In accordance with the illustrative embodiment, system 301 determines, for each given first tile, whether the one or more other tiles are directly visible from the first tile (i.e., whether there is line-of-sight visibility). System 301 assesses visibility from the predetermined reference point of each first tile and, in doing so, assesses whether the reference point of each of the one or more other tiles is visible from the reference point of the first tile.

Figure 9:
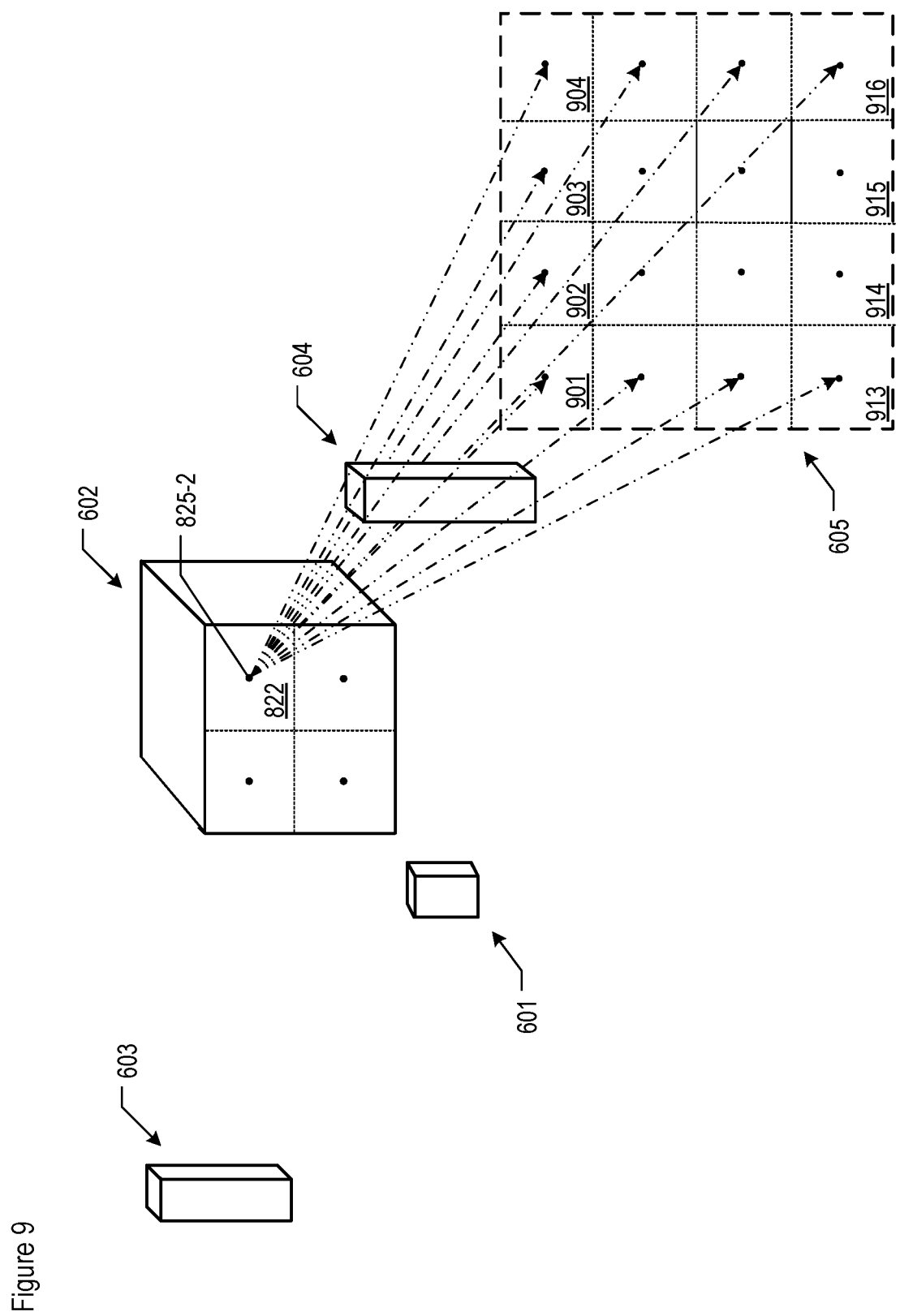
FIG. 9 depicts system 301 determining the visibility of one or more references points on the back surface of structure 605, from reference point 825-2 of tile 822.

As can be seen in FIG. 9, system 301 determines, for example, the visibility of one or more references points on the back surface of structure 605, from reference point 825-2 of tile 822. As depicted in the figure, the reference points of tiles 901 through 904 and tiles 913 through 916, as well as of other tiles, are directly visible from reference point 825-2. The reference points of tiles 914 and 915, as well as other tiles, are not visible from reference point 825-2 because they are blocked by structure 604.

In some embodiments of the present invention, system 301 stores the visibility indications as a matrix, while in some other embodiments, system 301 stores the visibility indications using a different technique. System 301 can determine visibility from each tile to one or more other tiles, as well as store the visibility indications, prior to any projecting of ray tubes that is based on visibility of one tile to another tile. This pre-computing of visibility can apply for either a given simulation run or as long as the dataset remains unchanged in terms of the relationship of the structures to one another.

In accordance with the illustrative embodiment, system 301 determines line-of-sight visibility. In some embodiments of the present invention, system 301 determines visibility based on a different criterion than line-of-sight.

Figure 10:
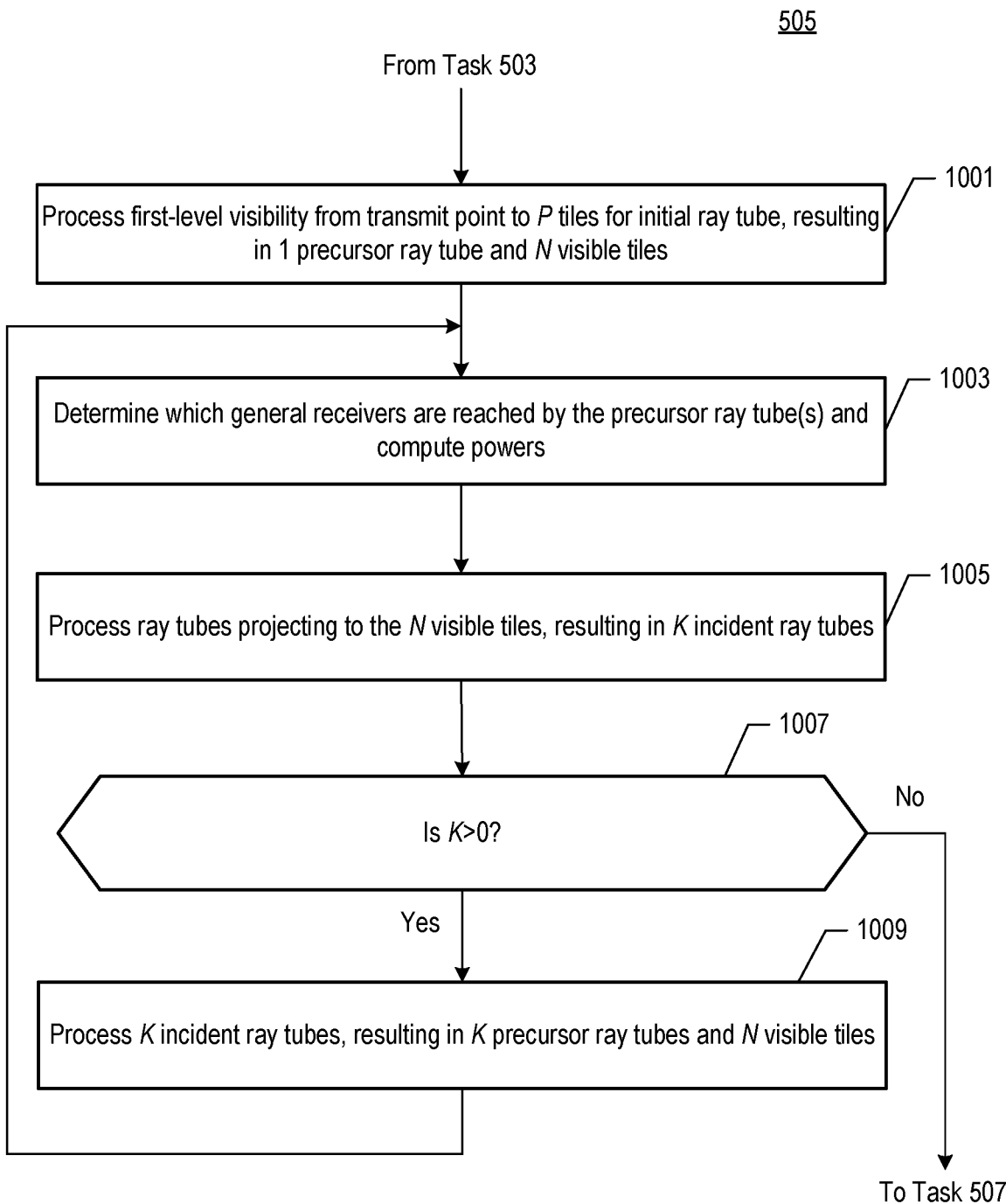
FIG. 10 depicts the sub-operations within operation 505, related to processing ray tubes.

FIG. 10 depicts the sub-operations within operation 505, related to processing ray tubes. In accordance with operation 1001, data-processing system 301 processes first-level visibility from a predetermined transmit point to P tiles for an initial ray tube, resulting in one precursor ray tube and N visible tiles. Operation 1001 is described below and in regard to FIG. 12.

In accordance with operation 1003, data-processing system 301 determines which general receivers are reached by the precursor ray tube or tubes and computes the powers received. Operation 1003 is described below and in regard to FIG. 16.

In accordance with operation 1005, data-processing system 301 processes ray tubes projecting to the N visible tiles, resulting in K incident ray tubes. Operation 1005 is described below and in regard to FIG. 18.

In accordance with operation 1007, data-processing system 301 determines if K is greater than zero. If so, control of execution proceeds to operation 1009. If not, control of execution proceeds to operation 507.

In accordance with operation 1009, data-processing system 301 processes K incident ray tubes, resulting in K precursor ray tubes and N visible tiles. Operation 1009 is described below and in regard to FIG. 20.

Figure 11:
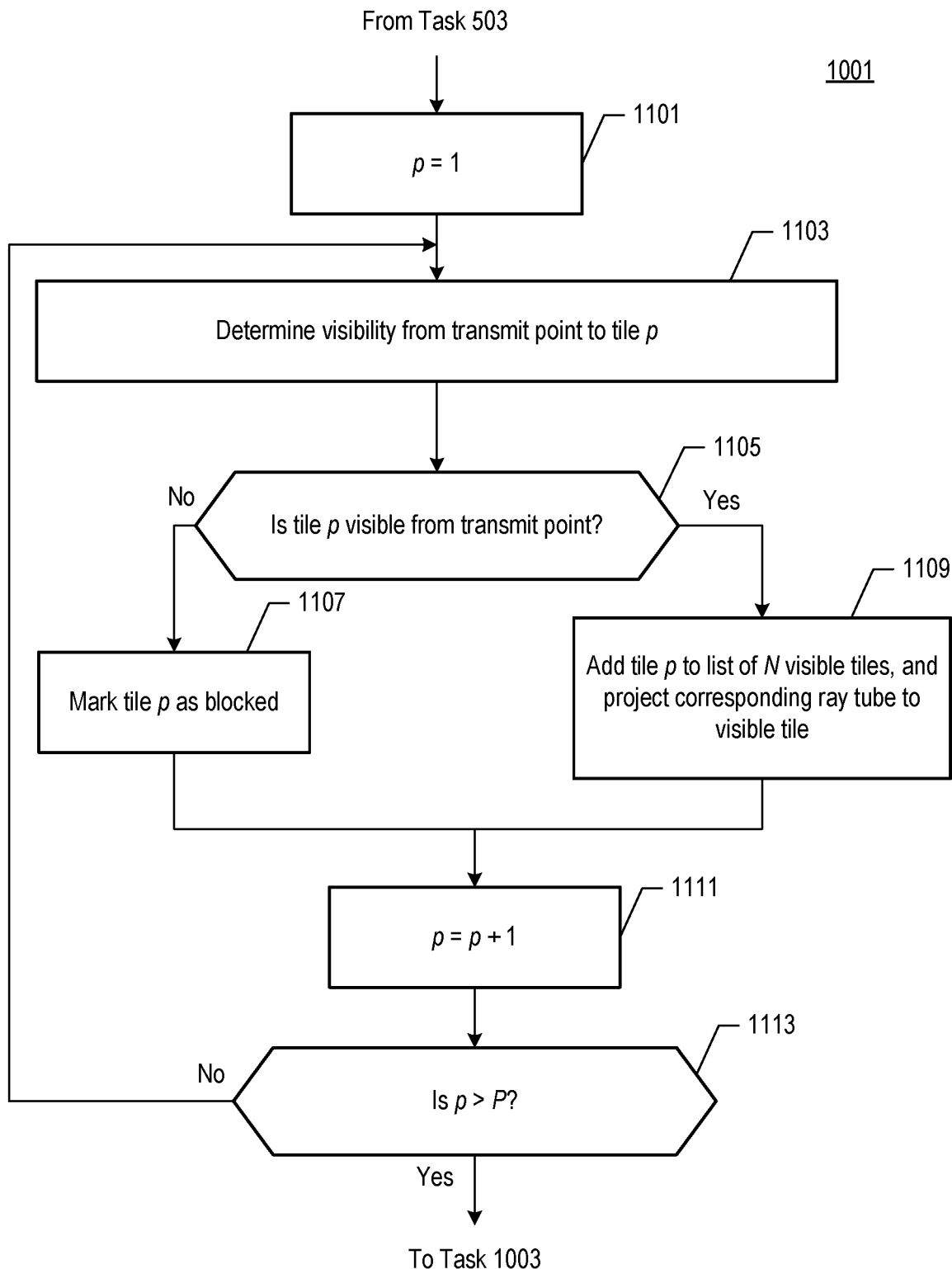
FIG. 11 depicts the sub-operations within operation 1001, related to processing first-level visibility.

FIG. 11 depicts the sub-operations within operation 1001, related to processing first-level visibility. In accordance with operation 1101, data-processing system 301 sets counter p equal to one.

In accordance with operations 1103 and 1105, data-processing system 301 determines visibility from the predetermined transmit point to the reference point of tile p. In accordance with the illustrative embodiment, direct (line-of-sight) visibility is determined, while in some other embodiments, a different type of visibility is determined. If tile p is not visible from the transmit point, control of execution proceeds to operation 1107, wherein system 301 marks tile p as blocked. If tile p is visible from the transmit point, control of execution proceeds to operation 1109.

In accordance with operation 1109, system 301 adds tile p to a list of N visible tiles. System 301 also projects the corresponding ray tube to the visible tile; in other words, the ray tube is projected based on whether tile p's reference point is visible from the transmit point. The ray tube is defined by the visible tile to which the ray tube is being projected; for example, the ray tube can be defined by the vertices of the tile. In some embodiments of the present invention, the ray tube is defined by one or more points on or near the visible tile to which the ray tube is being projected. In some embodiments of the present invention, system 301 projects ray tubes only toward visible tiles, as opposed to projecting a ray tube toward a non-visible tile or in a direction where there is no tile.

System 301 increments counter p in accordance with operation 1111. System 301 then determines whether the value of p is greater than P in accordance with operation 1113. Depending on the context, the value of P can be i) the total number of tiles in the database or ii) the number of tiles that are within a predetermined distance of the spawning tile or source point. If p is not greater than P, control of execution proceeds back to operation 1103. Otherwise, control of execution proceeds to operation 1003.

FIGS. 12 through 15 are now provided, which are intended to explain at least some of the salient sub-operations that make up operation 1001. As can be seen in an example starting in FIG. 12, predetermined transmit point 1201 represents one such transmit point as described above, although there can be multiple transmit points from which visibility is determined. In regard to operation 1001, an "original" ray tube at the start of ray tube processing is processed, having a solid angle of 4·pi. This original ray tube is represented by ray tube 1211, which is spherical in shape. In other words, power propagates in all directions from transmit point 1201.

Figure 13:
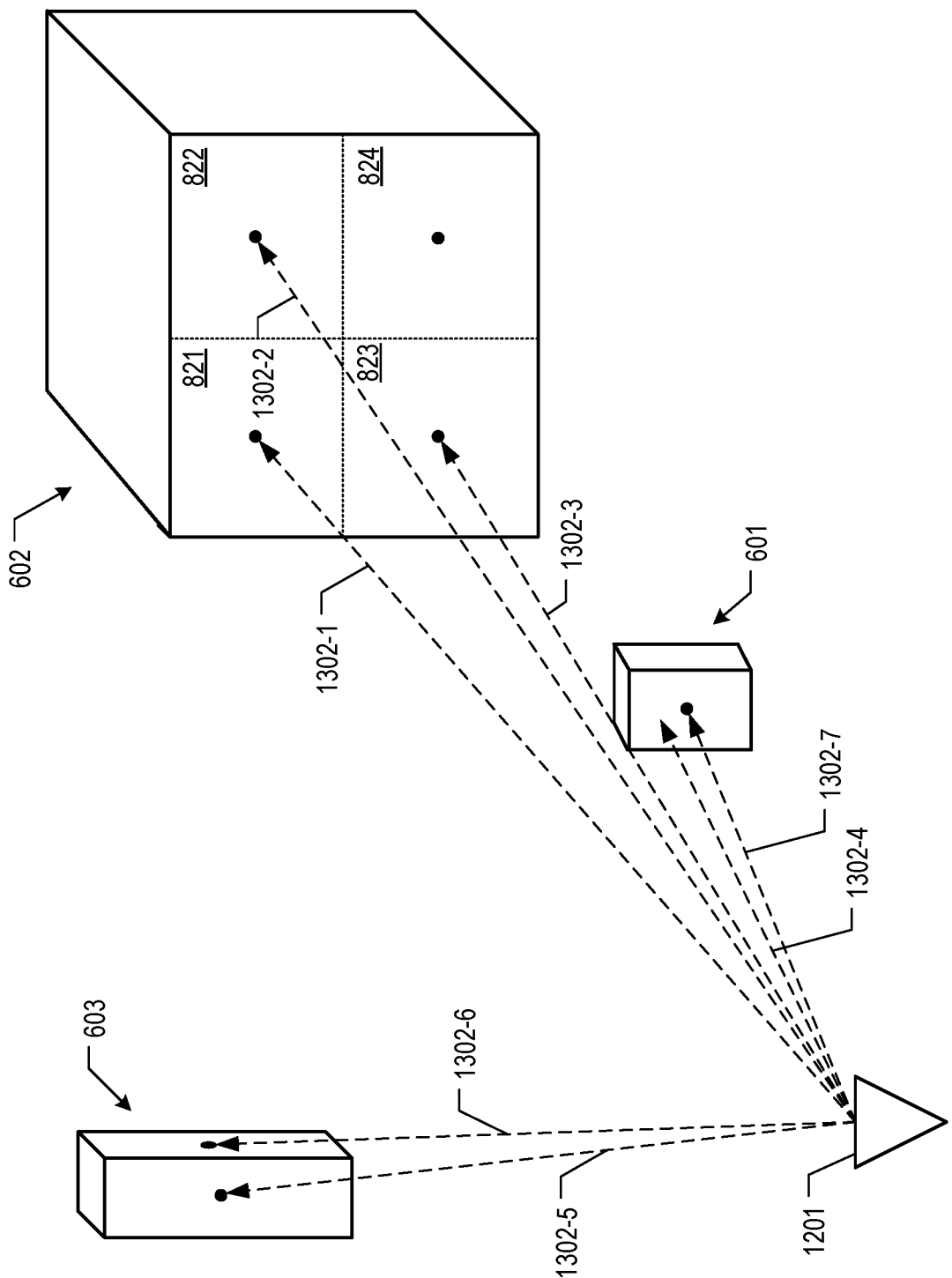
FIG. 13 depicts first-level visibility processing.

First-level visibility processing is depicted in FIG. 13, in which rays 1302-1, 1302-2, 1302-3, 1302-5, 1302-6, and 1302-7 have direct lines of sight on the reference points of their respective tiles. This being the case, the respective tiles are considered to be visible from transmit point 1201. In contrast, ray 1302-4 is blocked by structure 601; this being the case, tile 824 is considered not to be visible from transmit point 1201. As discussed in regard to subsequent figures, a ray tube can be projected to each visible tile, wherein the tiles have already been created in accordance with operation 701. One or more points (e.g., the vertices, etc.) on or near a corresponding tile can define each ray tube. In some embodiments, a ray tube being defined by the vertices means the edge of the ray tube cross-section at the surface of the tile includes the vertices, wherein in other embodiments, a ray tube being defined by vertices means that the ray tube cross-section is associated with vertices.

Figure 14:
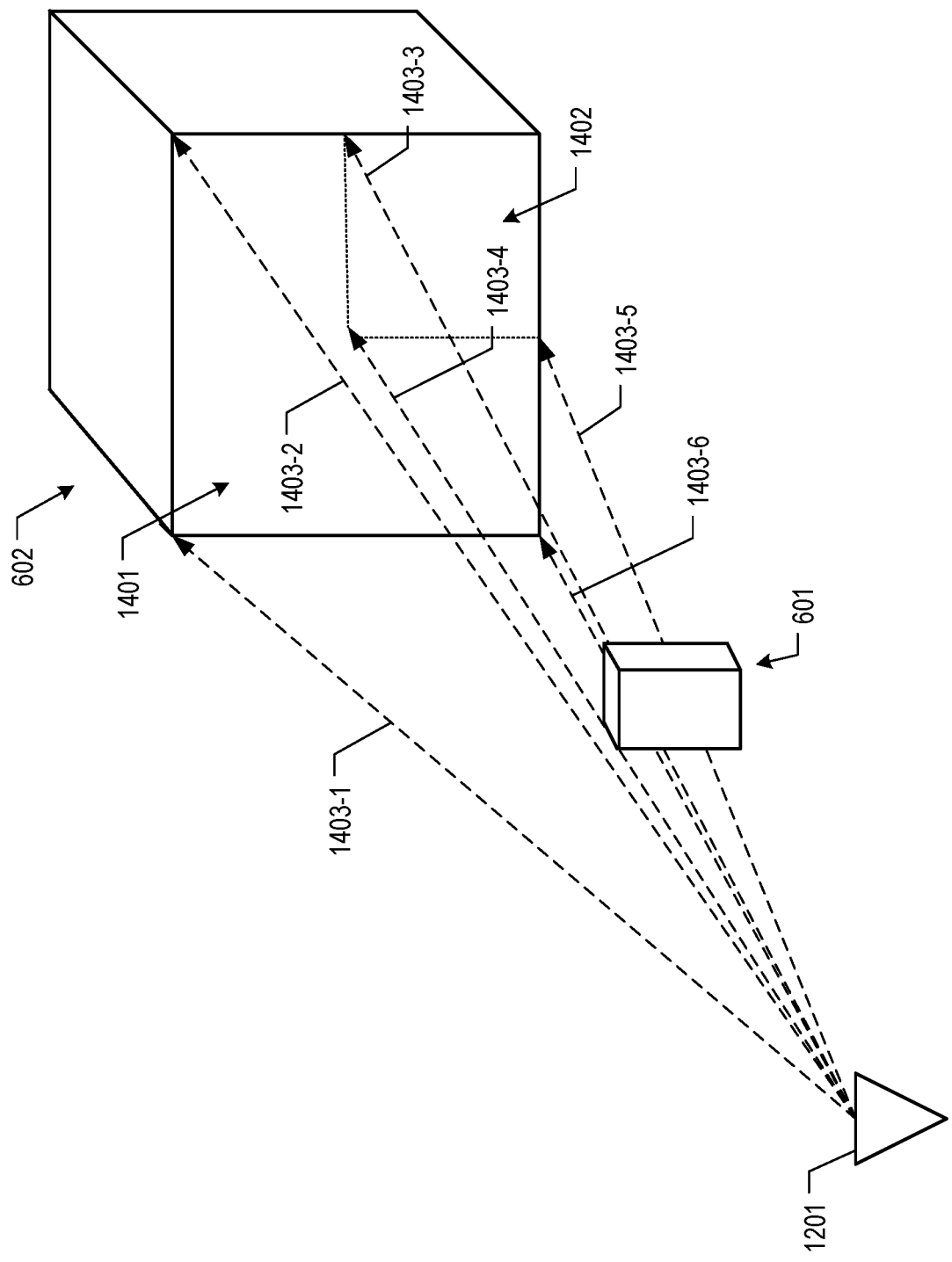
FIG. 14 depicts a technique in the prior art, in which a ray tube must assume a cross section that is based in part on one or more obstructions.

This is in contrast to what has been done in at least some techniques in the prior art, such as in FIG. 14, in which a ray tube must assume a cross section that is based in part on one or more obstructions. In FIG. 14, the ray tube defined by ray tube edges 1403-1 through 1403-6 is projected onto structure 602. The cross section of the ray tube is defined by structure 601 partially obstructing structure 602 from transmit point 1201, resulting in ray tube cross section 1401 and obstructed area 1402 (i.e., outside of the ray tube). The processing of ray tubes in the illustrative embodiment, such as those in subsequent figures (e.g., FIG. 15) represents an improvement over that in at least some techniques in the prior art. In the illustrative embodiment, the cross section is defined by the shape of each partitioned tile that is visible to the transmit point; consequently, the shape of a partitioned tile is relatively simple to process compared to the complex shape of the ray-tube cross section in FIG. 14.

Figure 12:
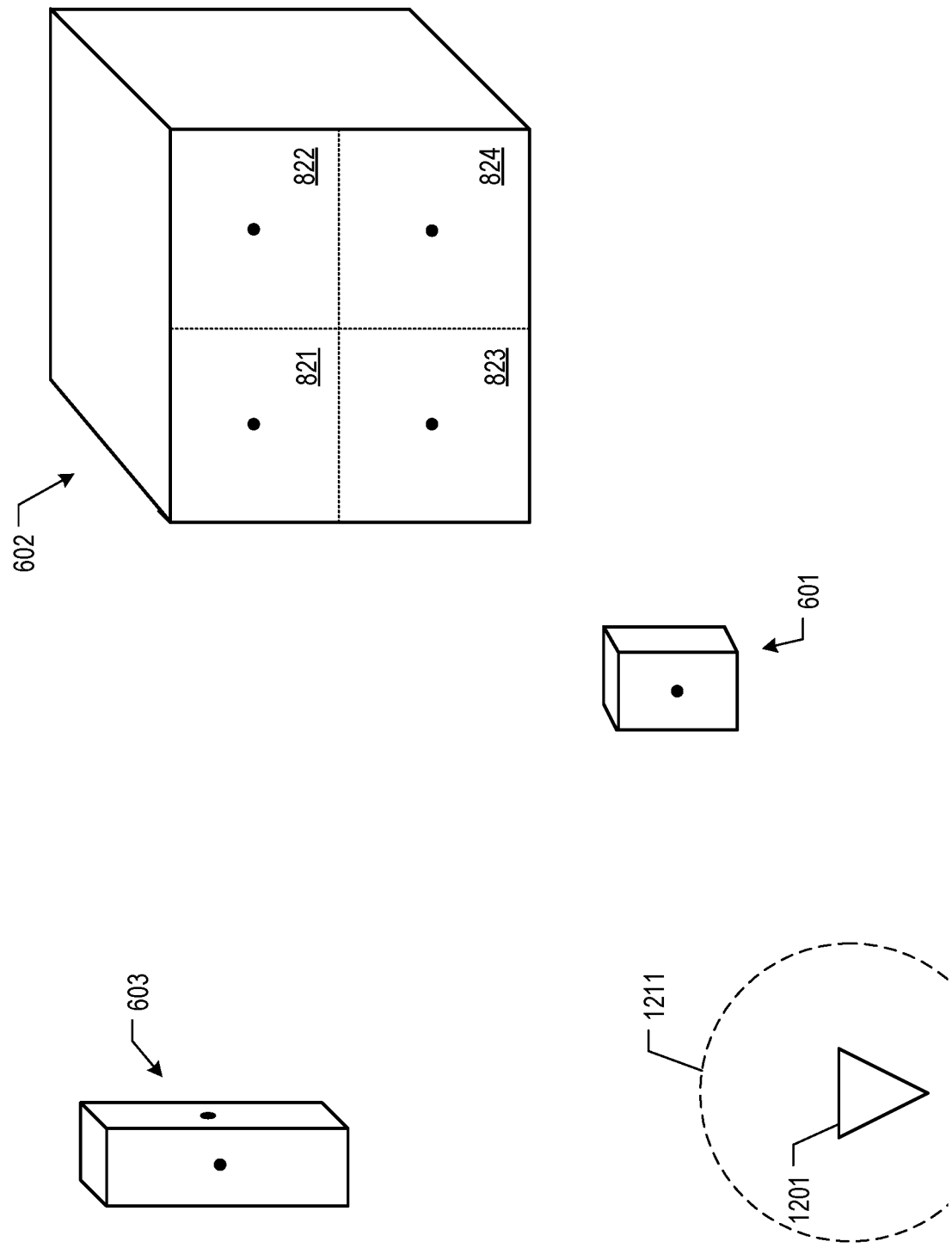
FIG. 12 depicts predetermined transmit point 1201.
Figure 15:
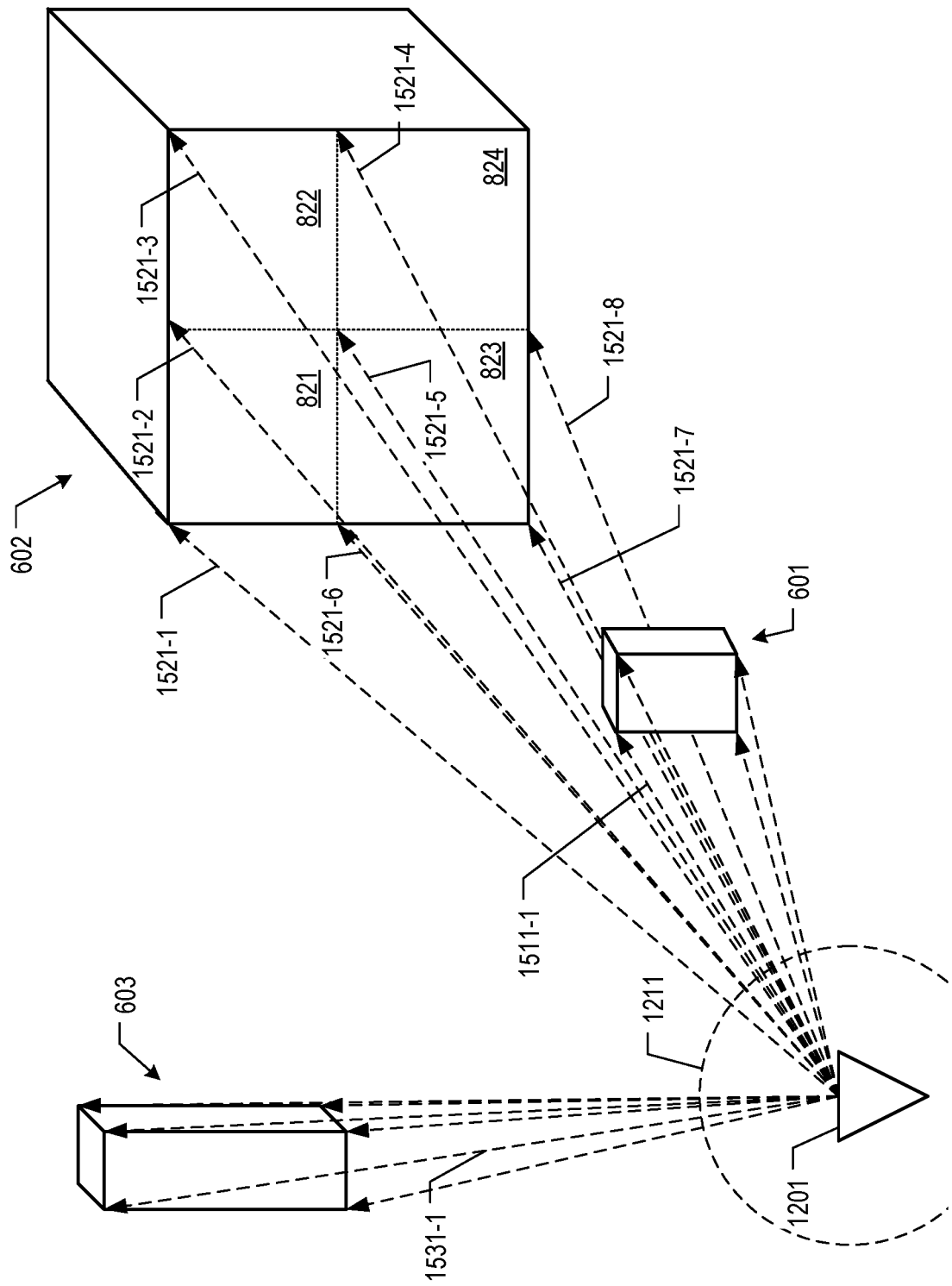
FIG. 15 depicts how original ray tube 1211 depicted in FIG. 12 is split into multiple ray tubes.

FIG. 15 depicts how original ray tube 1211 depicted in FIG. 12 is split into seven ray tubes. As depicted, there are six ray tubes to be projected to visible tiles: one to structure 601 (i.e., defined by the vertices corresponding to four ray tube edges including edge 1511-1), three to structure 602 (i.e., defined by the vertices corresponding to edges 1521-1 through 1521-8), and two to structure 603 (i.e., defined by the vertices corresponding to four ray tube edges including edge 1531-1). The seventh ray tube is for the solid angles not covered by the other six ray tubes, amounting to 4·pi minus the solid angles subtended by the other six ray tubes.

Figure 16:
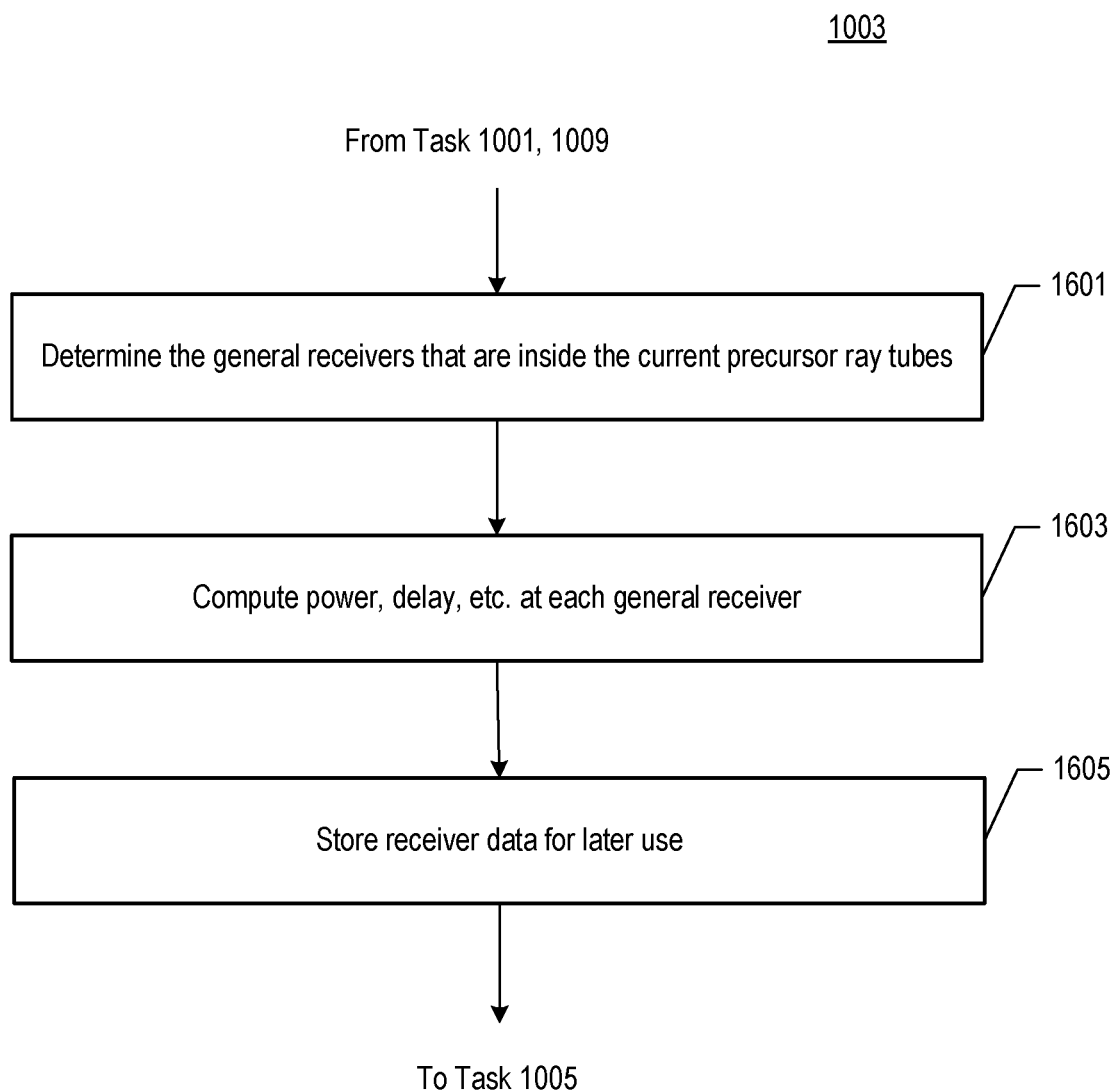
FIG. 16 depicts the sub-operations within operation 1003, related to determining which general receivers are reached by the precursor ray tubes.
Figure 17:
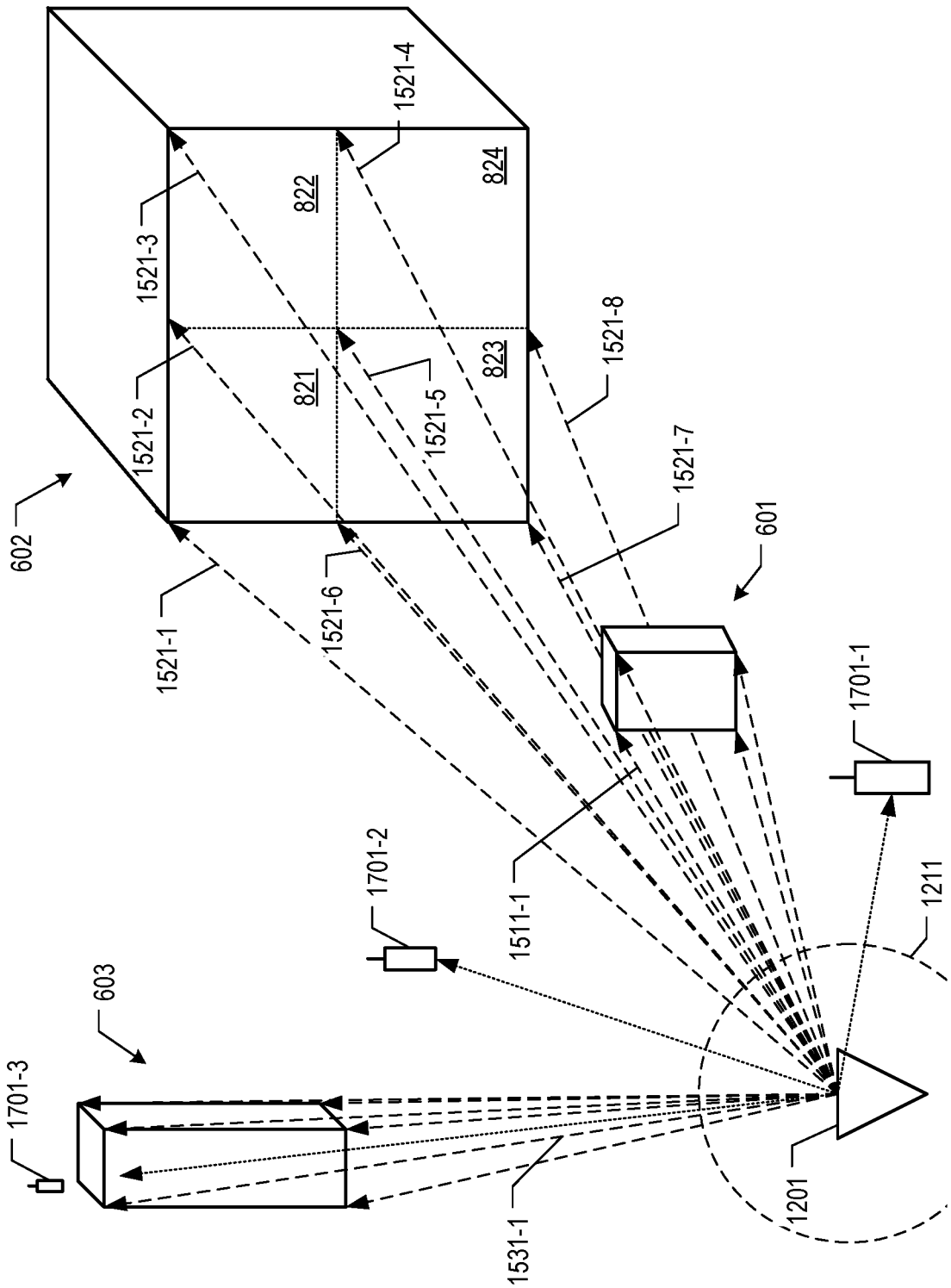
FIG. 17 depicts an example of operation 1001 having just been executed.

FIG. 16 depicts the sub-operations within operation 1003, related to determining which general receivers are reached by the precursor ray tubes. At this point in the processing, the precursor ray tubes are those resulting from the processing associated with i) operation 1001 for processing visibility from transmit point 1201 or ii) operation 1009 for processing visibility from one or more tiles. In accordance with operation 1601, data-processing system 301 determines the general receivers that are inside the current precursor ray tubes. FIG. 17 depicts an example of operation 1001 having just been executed. There are three general receivers of interest depicted: receivers 1701-1 through 1701-3. All three receivers are within at least the original ray tube.

In accordance with operation 1603, system 301 computes values of one or more signal characteristics (e.g., power, delay, etc.) at each receiver; the characteristic of power is used hereinafter for pedagogical purposes. First, to determine which receive points are valid, system 301 either i) directly computes visibility from transmit point 1201 to each receive point, in the case of operation 1001 having just been executed, or ii) uses the stored knowledge (from operation 703) of tiles visible from a tile from which a ray tube is being bounced, in the case of operation 1009 having just been executed. As a result of this, system 301 computes the power for receivers 1701-1 and 1701-2 because they are not only inside original ray tube 1211, but are not blocked by any of the objects the split ray tubes are incident on. In contrast, system 301 does not compute power for receiver 1701-3 because the receiver is blocked by structure 603 (i.e., one of the objects that one or more split ray tubes is incident on).

In accordance with operation 1605, system 301 stores the computed values of the signal characteristics for each receiver. These are intermediate results that can be used later.

Figure 18:
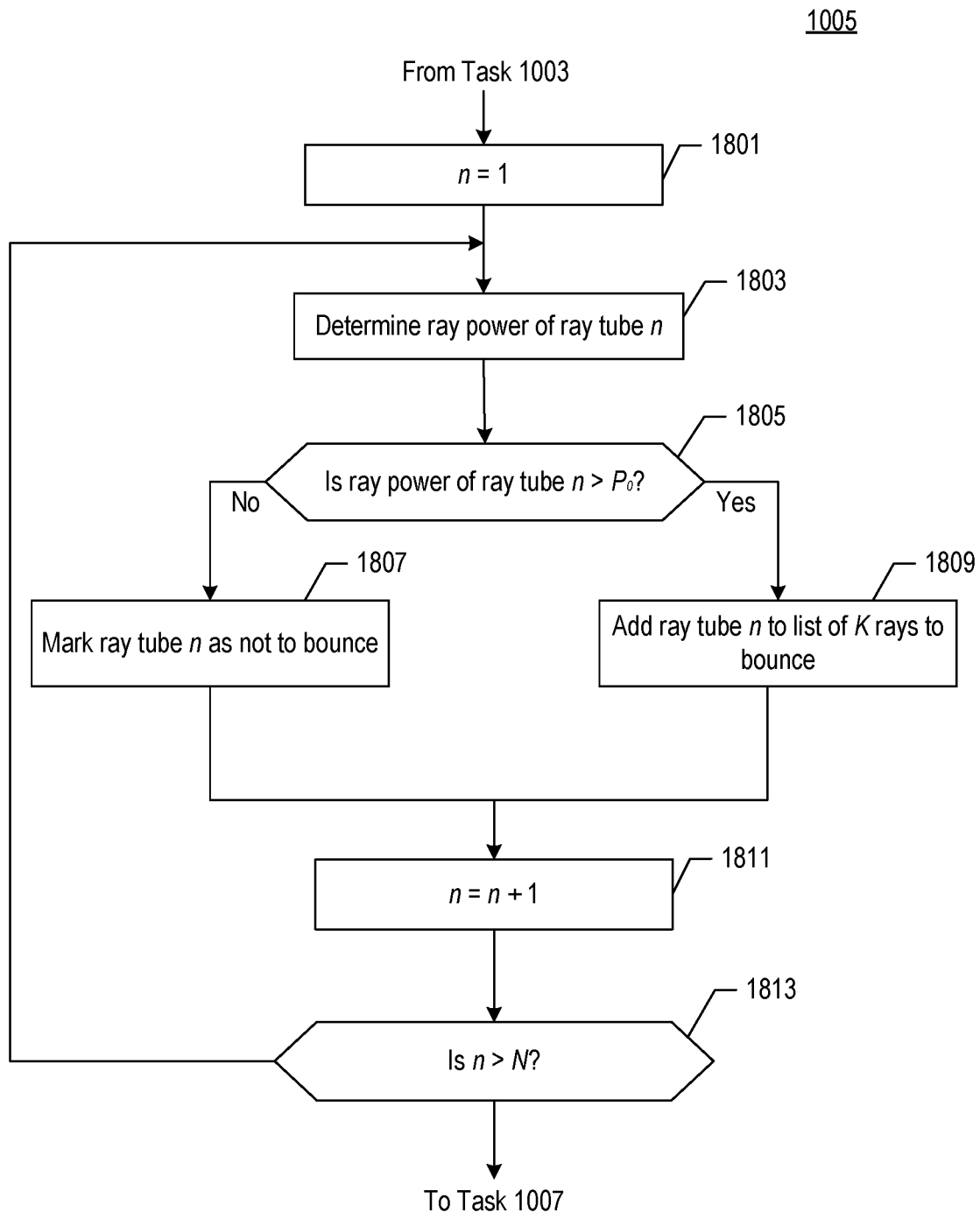
FIG. 18 depicts the sub-operations within operation 1005, related to processing the ray tubes projecting to the N visible tiles.

FIG. 18 depicts the sub-operations within operation 1005, related to processing the ray tubes projecting to the N visible tiles. In accordance with operation 1801, data-processing system 301 sets counter n equal to one.

In accordance with operation 1803, system 301 determines the ray power value of ray tube n. In some embodiments, the ray power of ray tube n is considered to be the power at the reference point of the corresponding tile (e.g., at the center, etc.).

Figure 19:
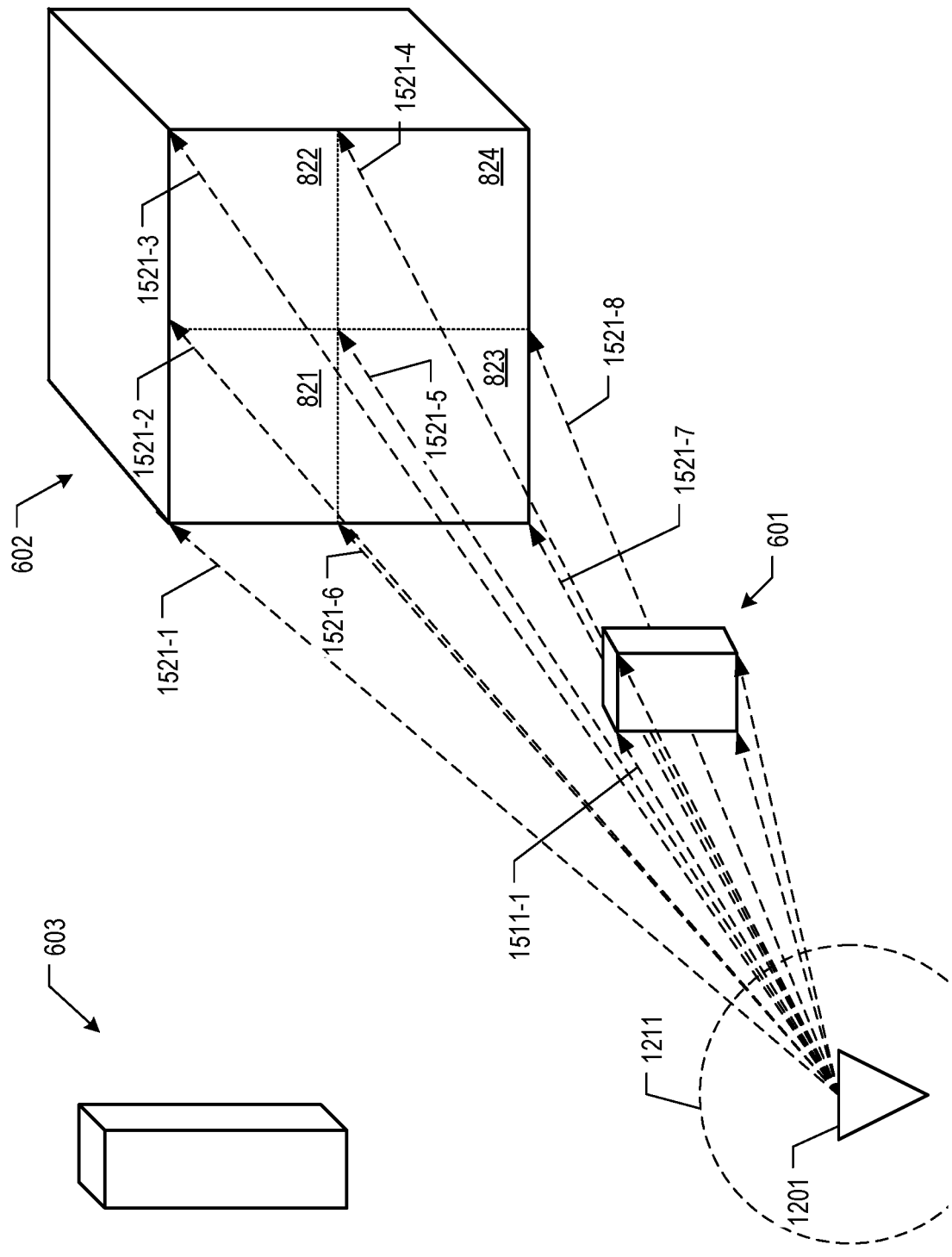
FIG. 19 depicts how the ray tubes incident on tiles on structures 601 and 602 have ray powers exceeding the threshold and, as a result, are bounced.

In accordance with operation 1805, system 301 determines whether the ray power of ray n is exceeds Po, a threshold value. As disclosed earlier, other criteria (e.g., delay, etc.) can be used; for example and without limitation, a maximum delay can be used to determine whether to propagate rays, instead of or in addition to using Po. If the ray power does not exceed the threshold, system 301 marks ray n as not to bounce, in accordance with operation 1807. Otherwise, if the ray power does exceed the threshold, in accordance with operation 1809, system 301 adds ray n to a list of rays to "bounce" (i.e., project again), wherein the total number of rays to bounce is referred to herein as K. In the example in FIG. 19, the ray tubes incident on tiles on structures 601 and 602 have ray powers exceeding the threshold and, as a result, will be bounced, whereas the ray tubes (shown previously in FIG. 17) incident on structure 603 have ray powers that do not exceed the threshold and, consequently, will not be bounced.

In the case of operation 1009 having just been executed, as opposed to operation 1001 having just been executed, it can be said that whether a ray tube is bounced or not off a tile also depends on the ray tube that is incident on the tile.

System 301 increments counter n in accordance with operation 1811 and determines whether n is greater than N in accordance with operation 1813. If n is not greater than N, control of execution proceeds back to operation 1803. Otherwise, if n is greater than N, control of execution proceeds to operation 1007.

Figure 20:
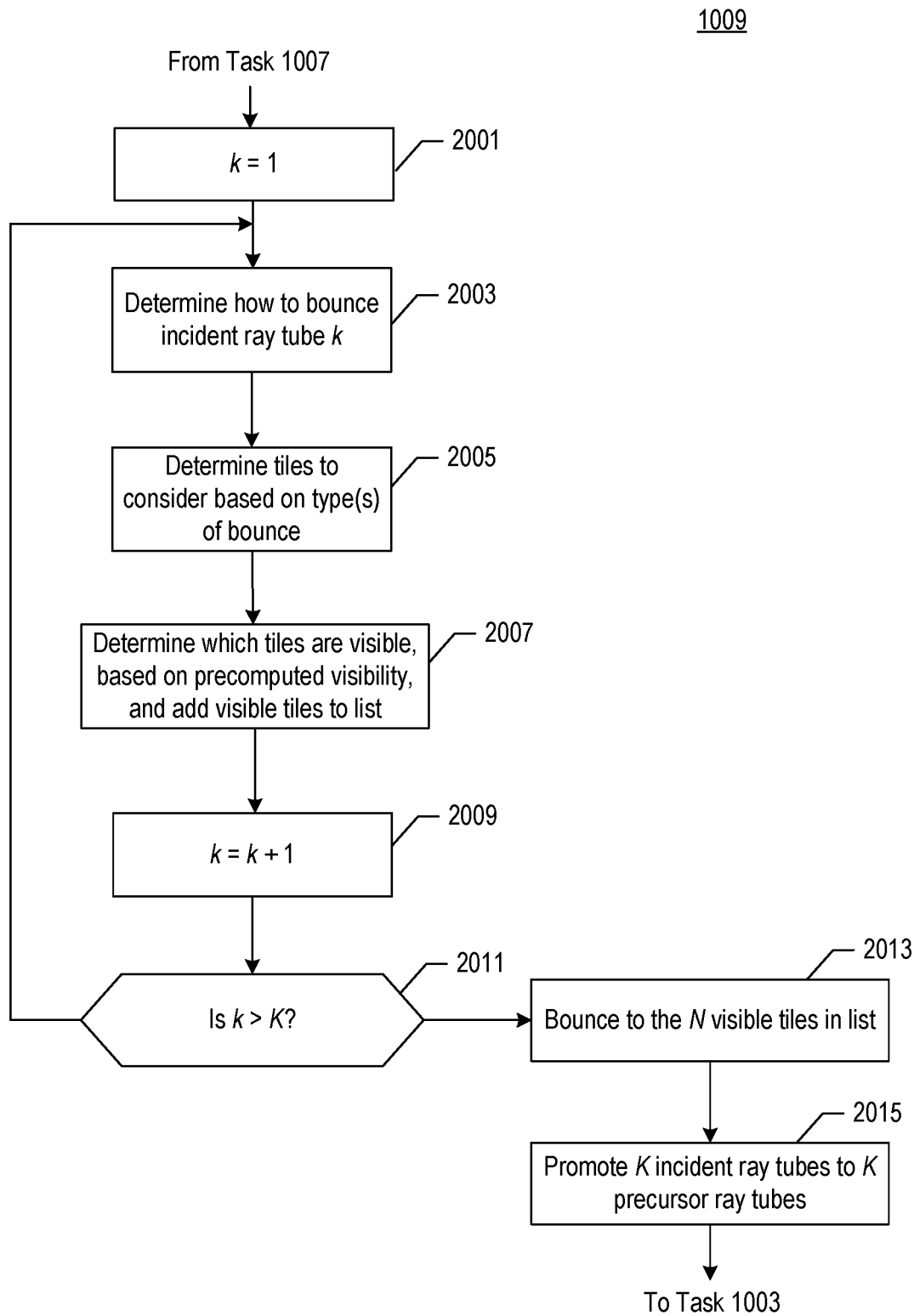
FIG. 20 depicts the sub-operations within operation 1009, related to processing the K incident ray tubes whose ray powers exceeded the threshold.

FIG. 20 depicts the sub-operations within operation 1009, related to processing the K incident ray tubes whose ray powers exceeded the threshold. FIGS. 21 through 26 depict various aspects of processing the K incident ray tubes and are described in more detail below.

In accordance with operation 2001, data-processing system 301 sets counter k equal to one.

In accordance with operation 2003, system 301 determines how to bounce ray tube k. For example, ray tube k can be bounced using reflection, diffraction, or scattering principles. In some embodiments, the stored information for each visible tile can also include the type of bouncing to utilize. Alternatively, the location of a tile on a surface of a structure can determine the type of bouncing; for example, tiles on the corner of a structure can be subjected to diffraction-type bouncing, while tiles toward the center of a surface can be subjected to reflection-type bouncing. More than one type of bouncing can apply to a given ray tube incident on a given tile.

In accordance with operation 2005, system 301 determines the spawning tiles to consider based on the type or types of bounce to utilize. For example, diffraction can require that both an incident tile and a tile adjacent to the incident tile are considered for assessing visibility to other tiles, wherein the two tiles have an edge of a structure in common (e.g., a corner of a building, etc.).

In accordance with operation 2007, system 301 determines which tiles are visible from each spawning tile being considered, based on the visibility precomputed in accordance with operation 703. The total number of visible tiles after all K ray tubes are consider is referred to herein as N.

System 301 increments counter k in accordance with operation 2009. In accordance with operation 2011, system 301 determines whether k is greater than K in accordance with operation 2011. If k is not greater than K, control of execution proceeds back to operation 2003. Otherwise, if k is greater than K, control of execution proceeds to operation 2013.

In accordance with operation 2013, system 301 bounces ray tubes to the N visible tiles in the list generated in accordance with operation 2007.

In accordance with operation 2015, system promotes the K "incident" ray tubes to K "precursor" ray tubes. Control of execution proceeds back to operation 1003 to process the precursor ray tubes.

Figure 21:
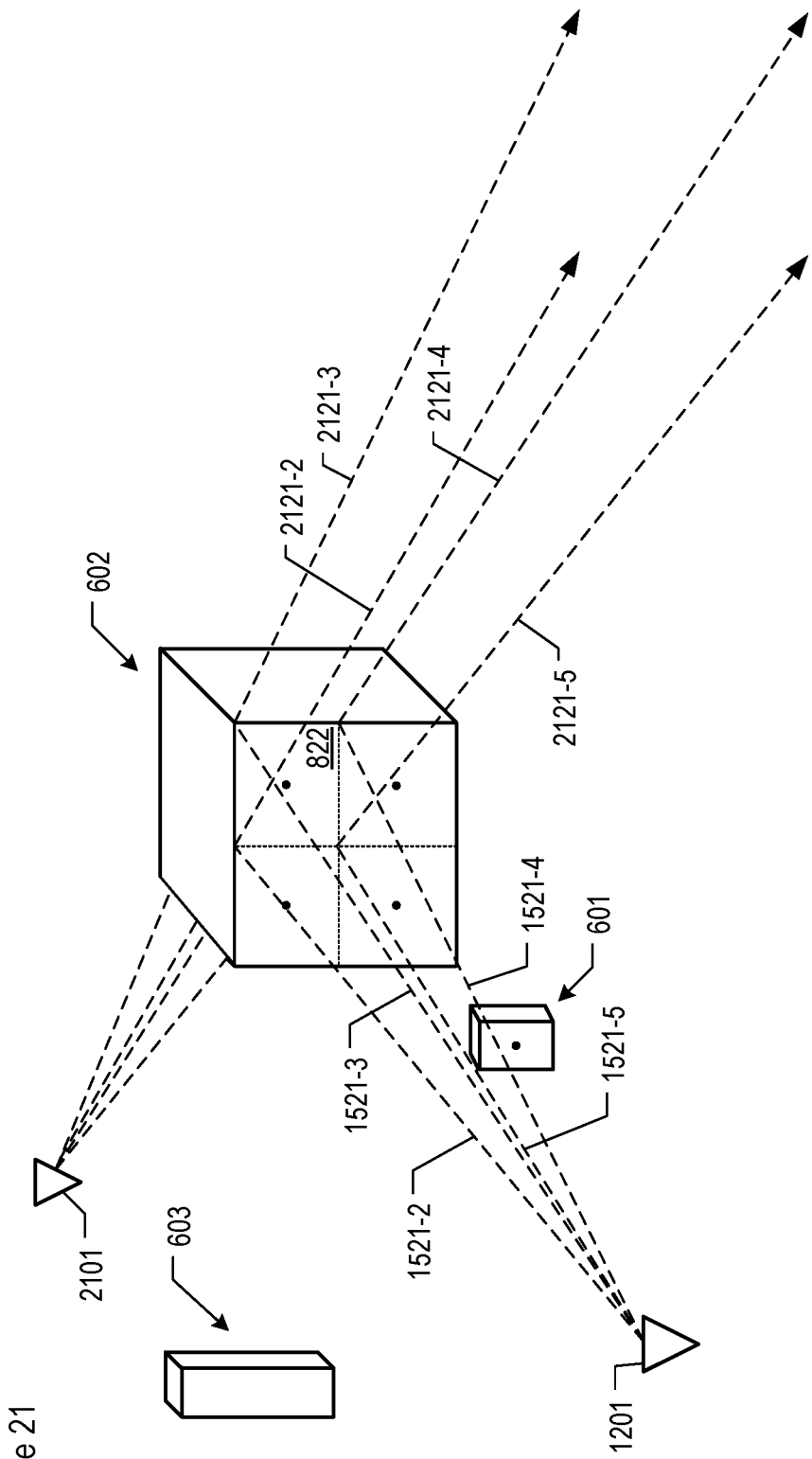
FIG. 21 illustrates the example of bouncing the incident ray tube defined by the vertices corresponding to ray tube edges 1521-2 through 1521-5 off of tile 822 on structure 602.

FIG. 21 graphically illustrates the example of bouncing (i.e., via reflection) the incident ray tube defined by the vertices corresponding to ray tube edges 1521-2 through 1521-5 off of tile 822 on structure 602, which in this context is a spawning tile as referred to earlier. The bouncing results in a resulting ray tube having a visibility region defined by vertices corresponding to ray tube edges 2121-2 through 2121-5, extending to infinity. For the next iteration, the resulting ray tube is regarded as one or more precursor ray tubes that are split.

The bouncing occurs based on the geometry of the system being considered and in accordance with the laws of physics. Conceptually, the direction of the resulting ray tube is determined by virtual source 2101 that originates a virtual ray tube from a position in space that is symmetrical around a plane that includes spawning tile 822, in relation to the position of transmit point 1201. The cross section of the ray tube at spawning tile 822 coincides with the tile's vertices.

Figure 22:
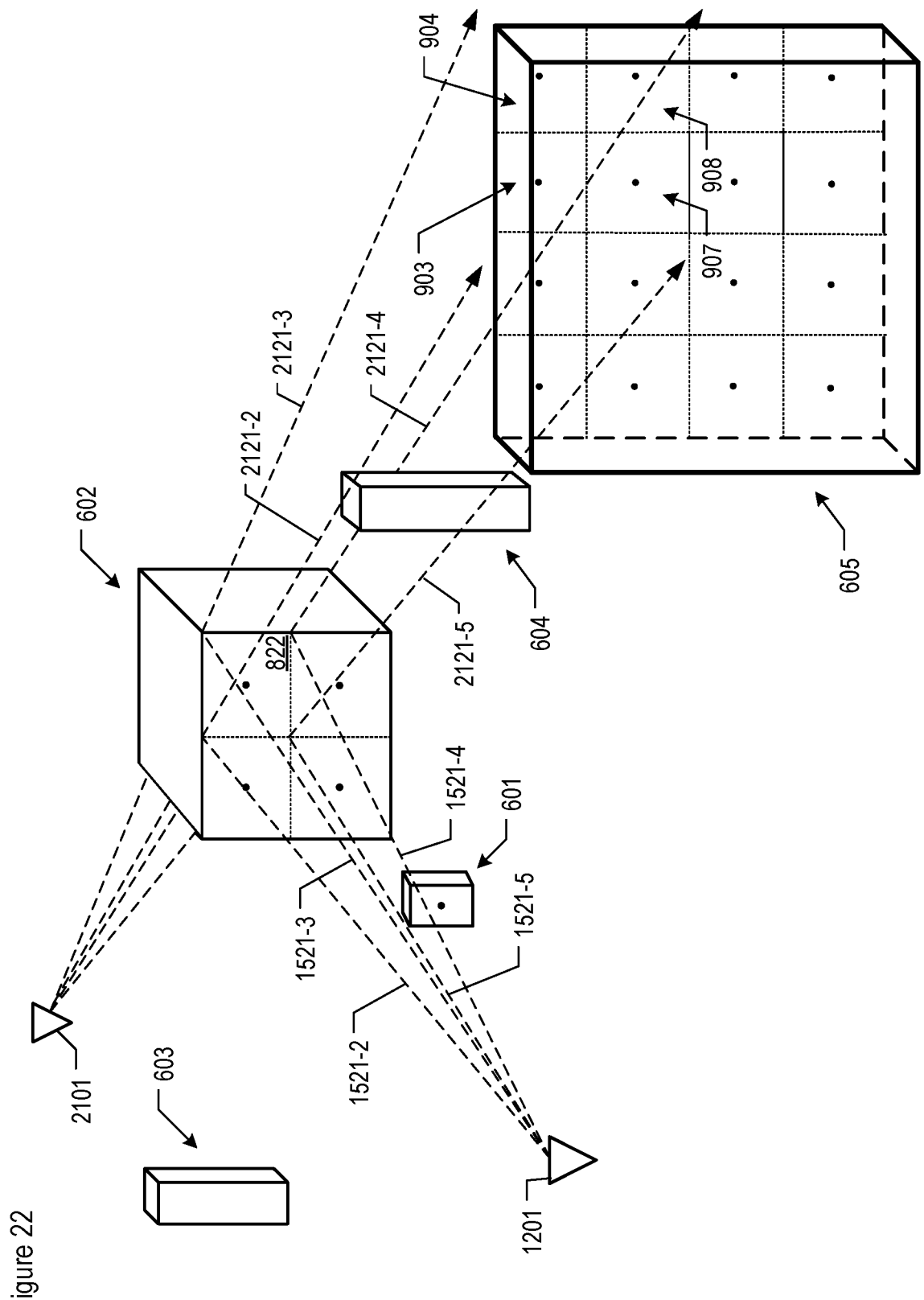
FIG. 22 continues with the example of bouncing the incident ray tube defined by ray tube edges 1521-2 through 1521-5 off of spawning tile 822 on structure 602.

FIG. 22 continues with the example of bouncing the incident ray tube defined by ray tube edges 1521-2 through 1521-5 off of spawning tile 822 on structure 602. The visibility region defined by ray tube edges 2121-2 through 2121-5 is generally incident on a portion of the back surface of structure 605 introduced in FIG. 6. At least tiles 903, 904, 907, and 908 of structure 605, which were introduced in FIG. 9, lie in the visibility region and, as such, are visible from spawning tile 822.

For the purposes of computing the one or more signal characteristics at each general receiver in accordance with operation 1603, the reflected ray tube depicted in FIG. 22 is split into multiple ray tubes, including ray tubes to one or more tiles on structure 605 and a ray tube for the solid angles not covered by the other tile-coincident ray tubes. This is similar to what was discussed above and in regard to FIG. 15. The difference here is that the multiple ray tubes can be conveniently approximated as originating at the center of spawning tile 822.

Figure 23:
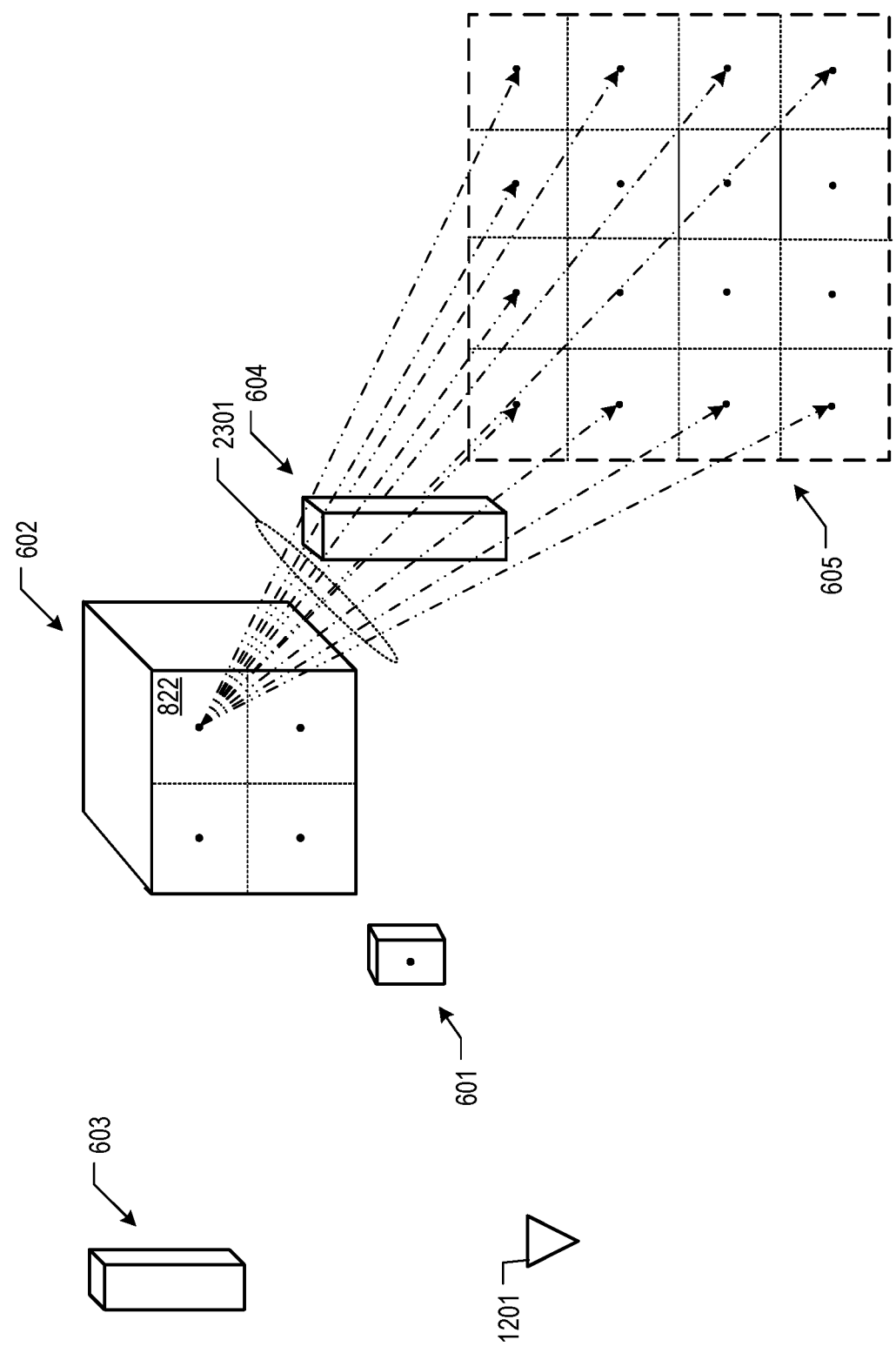
FIG. 23 illustrates pre-computed visibility.

FIG. 23 illustrates pre-computed visibility, wherein visibilities between tiles are precomputed in accordance with operation 703. In the figure, tiles on structure 605 that are visible to spawning tile 822 on the top right of structure 602 as depicted can be approximated by visibility from the reference point (e.g., center) on the spawning tile. The rays that are in ray group 2401 have direct lines of sight on the reference points of their respective tiles. This being the case, the respective tiles are considered to be visible from the reference point on spawning tile 822. In contrast, structure 604 are blocking some of the tiles on structure 605 from the reference point on spawning tile 822; this being the case, some of the tiles on structure 605 are considered not to be visible from the spawning tile's reference point.

The relationship between each spawning tile (i.e., on structure 602) and each evaluated tile (i.e., on structure 605 and possible other structures) can be pre-computed ahead of projecting the ray tubes, thereby reducing the processing resources required. One of the scenarios in which the number of processing cycles, for example, is decreased occurs when a ray tube is projected from a given spawning tile to a given incident tile or tiles multiple times during the course of the overall ray-tube processing associated with a given simulation run; when the visibility is precomputed once, that precomputed result can be used over and over again. Pre-computation between tiles is possible because the tiles inside a reflection ray tube, such as the reflection ray tube bounced off of spawning tile 822, are a subset of the tiles that are visible to the spawning tile. Pre-computation between tiles is also possible because their relative positions do not change, at least as long as the structures themselves (e.g., their relative positions, their dimensions, etc.) within the dataset do not change.

Figure 24:
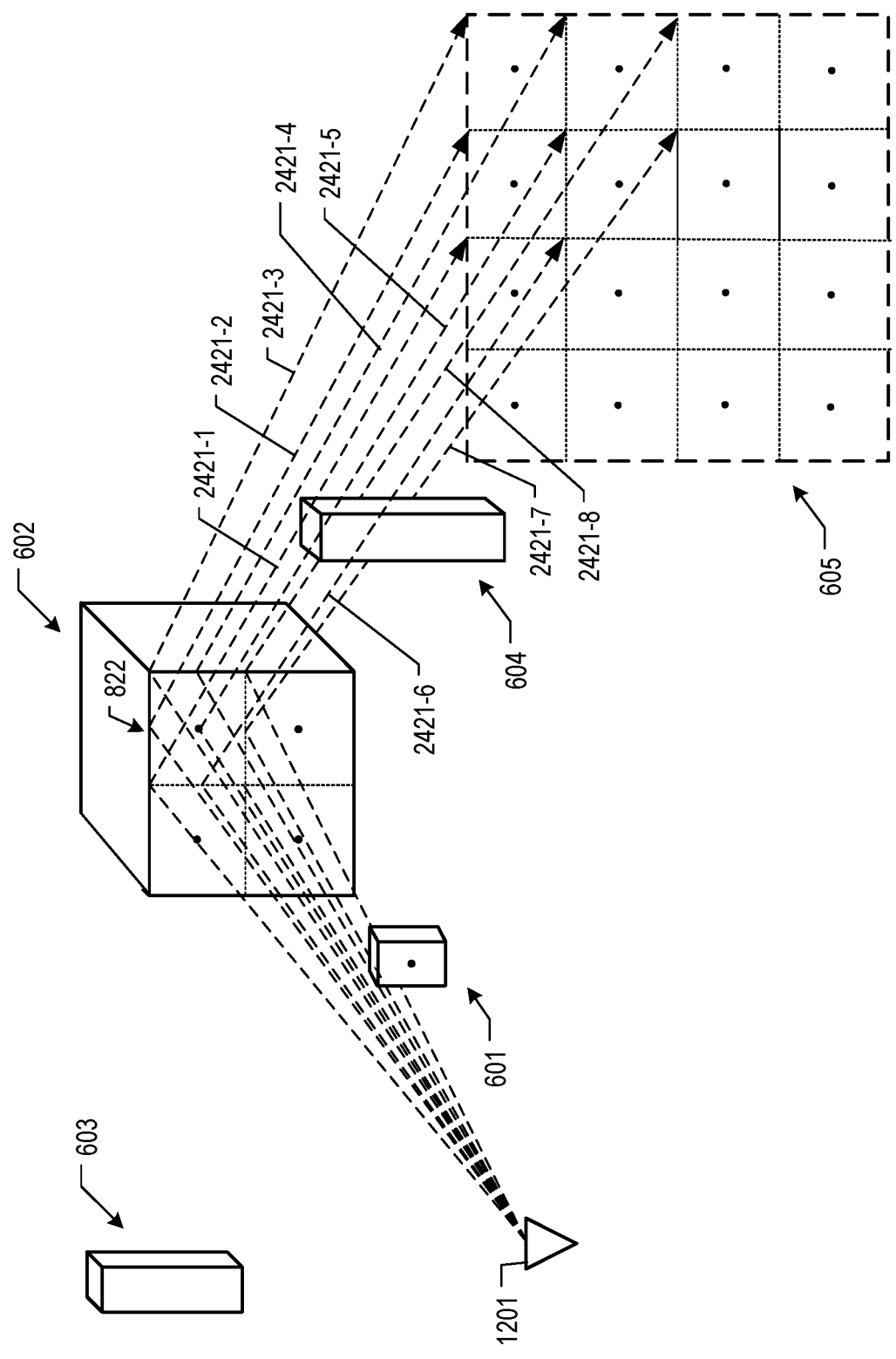
FIG. 24 depicts how the ray tube incident on tile 822 is split into multiple ray tubes.

FIG. 24 depicts how the ray tube incident on tile 822 is split into five ray tubes. As depicted, there are four ray tubes to be projected to visible tiles, including three to structure 605 (i.e., defined by ray tube edges 2421-1 through 2421-8) and one (not depicted) to structure 604. The fifth ray tube is for the solid angles not covered by the other four ray tubes, amounting to 4·pi minus the solid angles subtended by the other four ray tubes.

Figure 25:
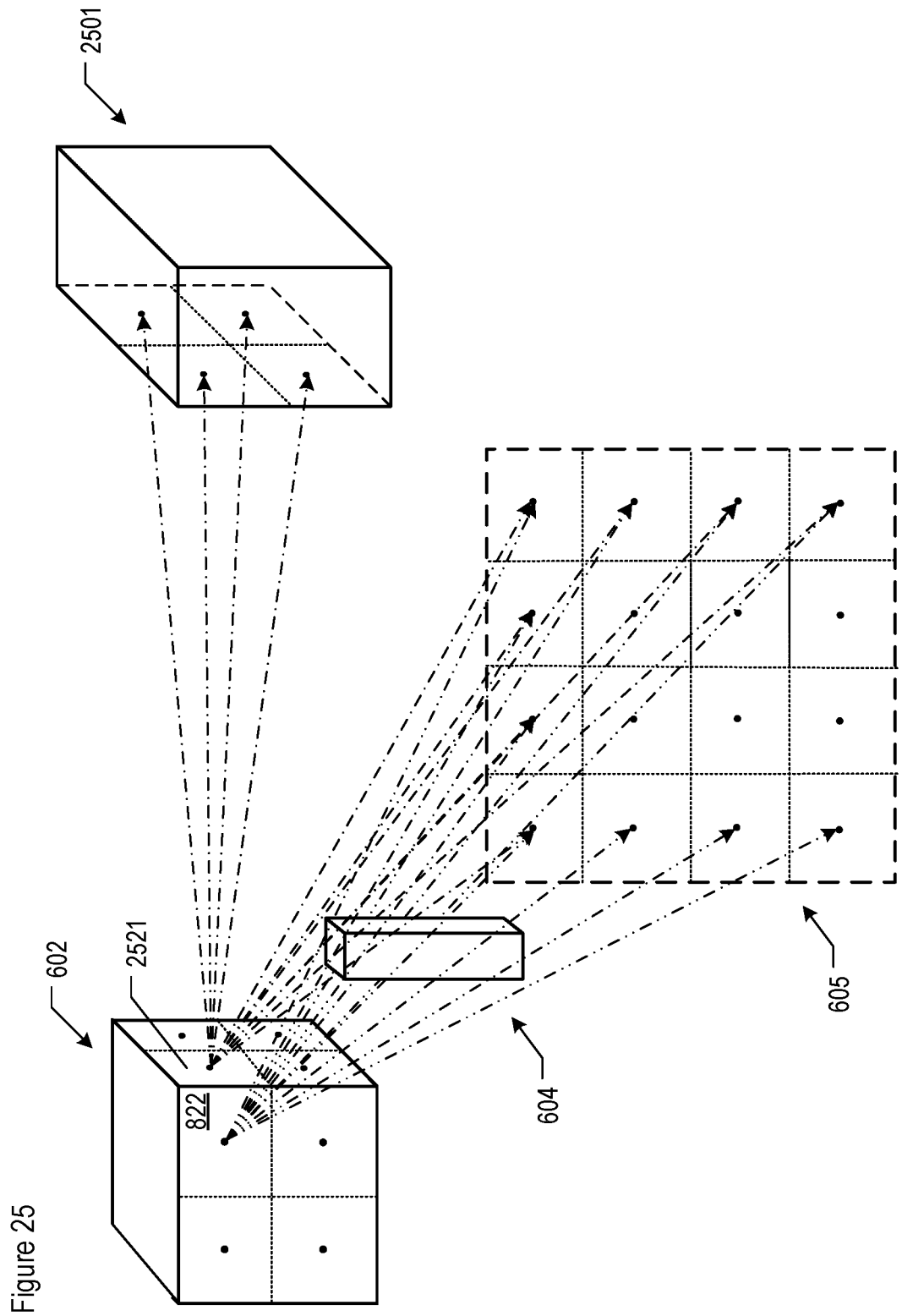
FIG. 25 illustrates a technique for the handling of diffraction from an edge of structure 602.

FIG. 25 illustrates a technique for the handling of diffraction from an edge of structure 602. As described earlier and with respect to operation 2003, diffraction is one way in which a ray tube can be bounced off of a structure. In accordance with the illustrative embodiment, the visibility from an edge of a spawning tile is approximately the aggregate visibility of the edge's adjacent tiles. For example, the edge on the right side of spawning tile 822 is also adjacent to tile 2521. Consequently, the pre-computed visibilities to other structures from tile 2521 are also considered. As depicted, tile 2501 has visibility to the reference points of some tiles on structure 605 and also to the reference points of some tiles on structure 2501, which is not visible from tile 822. Thus, in order to account for diffraction, additional ray tubes are to be projected to the visible tiles on structure 2501.

Figure 26:
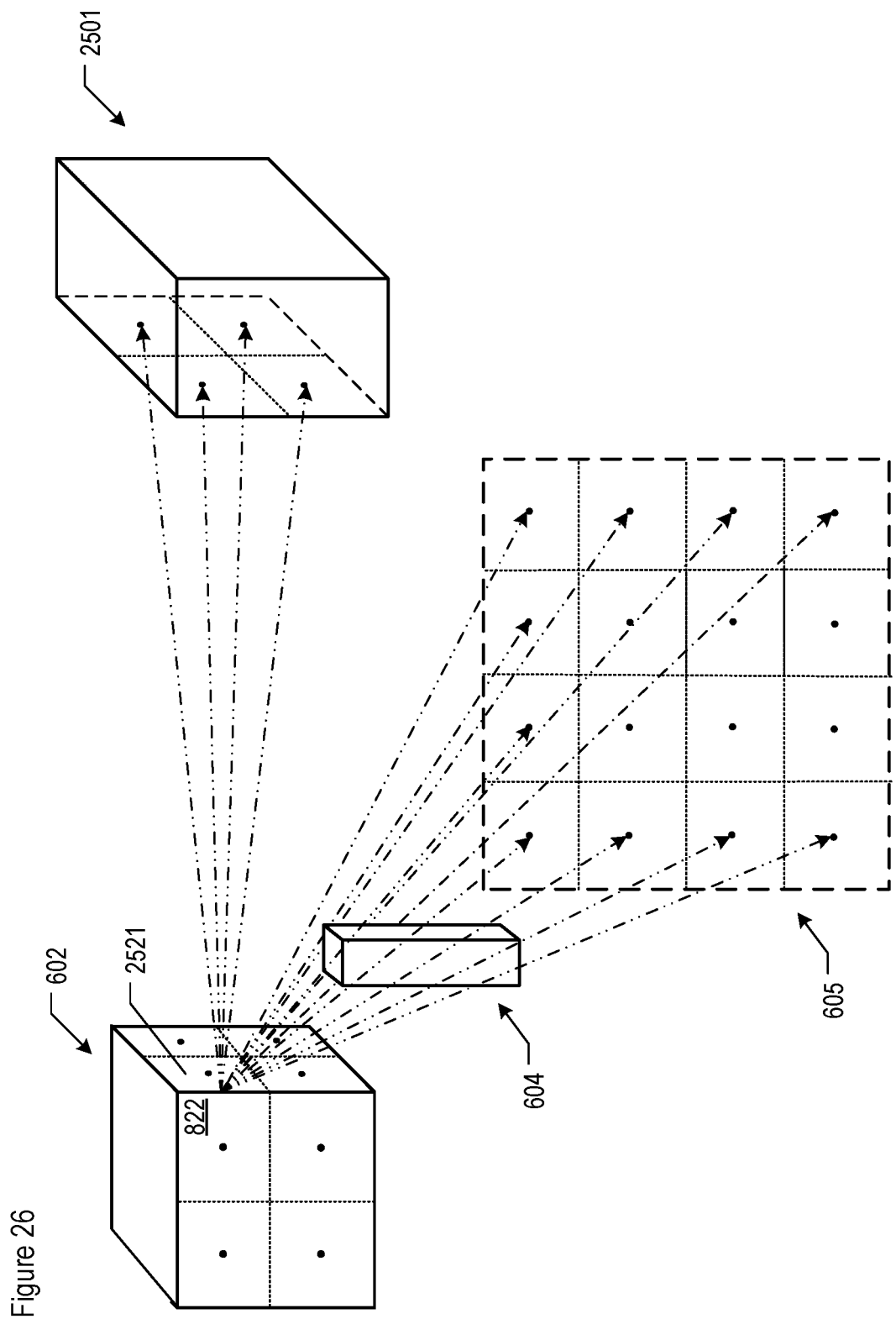
FIG. 26 illustrates the visibility from the edge adjacent to both tiles 822 and 2521.

FIG. 26 illustrates the visibility from the edge adjacent to both tiles 822 and 2521, which has been computed from the visibilities from the individual tiles as in FIG. 25. Generally-speaking, the spawning tile or tiles from which visibility is to be considered can depend upon the type of ray tube bouncing (e.g., reflection, diffraction, scattering, etc.) that is being modeled.

In accordance with the illustrative embodiment, data-processing system 301 can approximate visibility to an edge (i.e., as opposed to "from" an edge) by considering whether at least one of its adjacent tiles is visible to the reference point of the spawning tile. By determining this, system 301 can take into account the edge of the incident structure (i.e., in terms of the type of bouncing with which to bounce the ray tube) during the next iteration of bouncing.

It is to be understood that the disclosure teaches just one example of the illustrative embodiment and that many variations of the invention can easily be devised by those skilled in the art after reading this disclosure and that the scope of the present invention is to be determined by the following claims.

What is claimed is:

1. A method for ray launching, comprising:
receiving, by a data-processing system, a dataset that is representative of a first structure and a second structure within an environment, wherein the first structure and the second structure are defined in the dataset as having a first surface and a second surface, respectively;
determining, by the data-processing system, whether a reference point within each corresponding tile in a second plurality of tiles into which the second surface is partitioned, is visible or not from a reference point of a first spawning tile in a first plurality of tiles into which the first surface is partitioned, wherein an indication of the visibility of each corresponding tile from the first spawning tile is stored into a computer memory;
projecting, by the data-processing system, a first set of incident ray tubes from the reference point of the first spawning tile to the tiles in the second plurality of tiles, wherein each ray tube in the first set of incident ray tubes is projected toward and defined by a corresponding tile in the second plurality of tiles, including a first incident ray tube projected toward and defined by a first incident tile having a first point, and wherein each ray tube in the first set of incident ray tubes is projected based on i) each of the corresponding tiles in the second plurality of tiles lying within a region defined by bounced ray tube edges of a first precursor ray tube that is incident on the first spawning tile and ii) the stored indication of the visibility of each of the corresponding tiles in the second plurality of tiles from the first spawning tile;
bouncing, by the data-processing system, the first incident ray tube from the first incident tile, wherein the bouncing of the first incident ray tube results in a first bounced ray tube;
evaluating, by the data-processing system, an incidence of bounced ray tubes at a predetermined receive point within the environment, wherein at least one of the bounced ray tubes is based on the first bounced ray tube; and
presenting, by the data-processing system, a propagation result that is based on the evaluating of the incidence of bounced ray tubes.

2. The method of claim 1, wherein the first structure and the second structure are a first building and a second building, respectively, and wherein the first surface and the second surface are defined by a first exterior side of the first building and a second exterior side of the second building, respectively.

3. The method of claim 1, wherein the reference point is a center point at the center of the first spawning tile, and wherein the first incident ray tube is further defined by all of the vertices of the first incident tile.

4. The method of claim 1, wherein the indication of the visibility of each corresponding tile from the first spawning tile is further based on whether the reference point of each corresponding tile in the second plurality of tiles is directly visible or not from the reference point of the first spawning tile.

5. The method of claim 1, further comprising:
determining, by the data-processing system, whether the reference point of each corresponding tile in the second plurality of tiles is visible or not from the reference point of a second spawning tile in the first plurality of tiles, wherein an indication of the visibility of each corresponding tile from the second spawning tile is stored into the computer memory; and
projecting, by the data-processing system, a second set of incident ray tubes from the reference point of the second spawning tile to the tiles in the second plurality of tiles, wherein each ray tube in the second set of incident ray tubes is projected toward and defined by a corresponding tile in the second plurality of tiles, and wherein each ray tube in the second set of incident ray tubes is projected based on i) each of the corresponding tiles in the second plurality of tiles lying within a region defined by bounced ray tube edges of a second precursor ray tube that is incident on the second spawning tile and ii) the stored indication of the visibility of each of the corresponding tiles in the second plurality of tiles from the second spawning tile;
wherein at least another of the bounced ray tubes is based on at least one of the ray tubes projected in the second set of incident ray tubes.

6. The method of claim 1, further comprising:
determining, by the data-processing system, whether the reference point within each corresponding tile in the second plurality of tiles is visible or not from a reference point within a third spawning tile in a third plurality of tiles into which a third surface of one of the first and second structure is partitioned, wherein an indication of the visibility of each corresponding tile from the third spawning tile is stored into the computer memory; and
projecting, by the data-processing system, a third set of incident ray tubes from the reference point of the third spawning tile to the tiles in the second plurality of tiles, wherein each ray tube in the third set of incident ray tubes is projected toward and defined by a corresponding tile in the second plurality of tiles, and wherein each ray tube in the third set of incident ray tubes is projected based on the stored indication of the visibility of each of the corresponding tiles in the second plurality of tiles from the third spawning tile;
wherein at least another of the bounced ray tubes is based on at least one of the ray tubes projected in the third set of incident ray tubes.

7. The method of claim 6, wherein the first spawning tile and the third spawning tile are adjacent to each other and on different surfaces of the first structure, and wherein each ray tube in the third set of incident ray tubes is projected further based on the first precursor ray tube incident on the first spawning tile.

8. The method of claim 1, wherein the bouncing of the first incident ray tube is dependent upon power of the first incident ray tube at the first point on the first incident tile exceeding a threshold.

9. The method of claim 8, wherein the bouncing of the first incident ray tube is further based on a maximum delay at the first point on the first incident tile.

10. The method of claim 1, wherein the bounced ray tube edges of the first precursor ray tube are projected in directions that are based on the incident direction of the first precursor ray tube to the first spawning tile.

11. The method of claim 1, further comprising:
projecting, by the data-processing system, a second set of incident ray tubes from the reference point of the first spawning tile to the tiles in the second plurality of tiles, wherein each ray tube in the second set of incident ray tubes is projected based on each of the corresponding tiles in the second plurality of tiles lying within a region defined by bounced ray tube edges of a second precursor ray tube that is incident on the first spawning tile;
wherein at least another of the bounced ray tubes is based on at least one of the ray tubes projected in the second set of incident ray tubes.

12. A method for ray launching, comprising:
receiving, by a data-processing system, a dataset that is representative of a first structure and a second structure within an environment, wherein the first structure and the second structure are defined in the dataset as having a first surface and a second surface, respectively;
partitioning, by the data-processing system, the first surface into a first plurality of tiles and the second surface into a second plurality of tiles, wherein each of the tiles in the first plurality of tiles and in the second plurality of tiles has a center point at the center of the tile;
determining, by the data-processing system, whether the center point of each corresponding tile in the second plurality of tiles is directly visible or not from the center point of a first spawning tile in the first plurality of tiles, wherein an indication of the visibility of each corresponding tile from the first spawning tile is stored into a computer memory;
projecting, by the data-processing system, a first set of incident ray tubes from the center point of the first spawning tile to the tiles in the second plurality of tiles, wherein each ray tube in the first set of incident ray tubes is projected toward and defined by a corresponding tile in the second plurality of tiles, including a first incident ray tube projected toward and defined by a first incident tile having a first point, and wherein each ray tube in the first set of incident ray tubes is projected based on i) each of the corresponding tiles in the second plurality of tiles lying within a region defined by bounced ray tube edges of a first precursor ray tube that is incident on the first spawning tile and ii) the stored indication of the visibility of each of the corresponding tiles in the second plurality of tiles from the first spawning tile;
bouncing, by the data-processing system, the first incident ray tube from the first incident tile, wherein the bouncing of the first incident ray tube results in a first bounced ray tube;
evaluating, by the data-processing system, an incidence of bounced ray tubes at a predetermined receive point within the environment, wherein at least one of the bounced ray tubes is based on the first bounced ray tube; and
presenting, by the data-processing system, a propagation result that is based on the evaluating of the incidence of bounced ray tubes.

13. The method of claim 12, further comprising:
determining, by the data-processing system, whether the center point of each corresponding tile in the second plurality of tiles is visible or not from the center point of a second spawning tile in the first plurality of tiles, wherein an indication of the visibility of each corresponding tile from the second spawning tile is stored into the computer memory; and
projecting, by the data-processing system, a second set of incident ray tubes from the center point of the second spawning tile to the tiles in the second plurality of tiles, wherein each ray tube in the second set of incident ray tubes is projected toward and defined by a corresponding tile in the second plurality of tiles, and wherein each ray tube in the second set of incident ray tubes is projected based on i) each of the corresponding tiles in the second plurality of tiles lying within a region defined by bounced ray tube edges of a second precursor ray tube that is incident on the second spawning tile and ii) the stored indication of the visibility of each of the corresponding tiles in the second plurality of tiles from the second spawning tile;

wherein at least another of the bounced ray tubes is based on at least one of the ray tubes projected in the second set of incident ray tubes.

14. The method of claim 13, further comprising:

partitioning, by the data-processing system, a third surface of one of the first and second structure into a third plurality of tiles, wherein each of the tiles in the third plurality of tiles has a center point at the center of the tile;

determining, by the data-processing system, whether the center point of each corresponding tile in the second plurality of tiles is visible or not from the center point of a third spawning tile in the third plurality of tiles, wherein an indication of the visibility of each corresponding tile from the third spawning tile is stored into the computer memory; and projecting, by the data-processing system, a third set of incident ray tubes from the center point of the third spawning tile to the tiles in the second plurality of tiles, wherein each ray tube in the third set of incident ray tubes is projected toward and defined by a corresponding tile in the second plurality of tiles, and wherein each ray tube in the third set of incident ray tubes is projected based on the stored indication of the visibility of each of the corresponding tiles in the second plurality of tiles from the third spawning tile.

15. The method of claim 12, wherein the first incident ray tube is further defined by all of the vertices of the first incident tile.

16. The method of claim 12, wherein the bouncing of the first incident ray tube is dependent upon power of the first incident ray tube at the first point on the first incident tile exceeding a threshold.

17. The method of claim 16, wherein the bouncing of the first incident ray tube is further based on a maximum delay at the first point on the first incident tile.

18. The method of claim 12, wherein the bounced ray tube edges of the first precursor ray tube are projected in directions that are based on the incident direction of the first precursor ray tube to the first spawning tile.

* * * * *